United States Patent
Guan et al.

(10) Patent No.: US 7,043,126 B2
(45) Date of Patent: May 9, 2006

(54) GRADED-INDEX MULTIMODE FIBER AND MANUFACTURING METHOD THEREFOR

(75) Inventors: Ning Guan, Sakura (JP); Katsuhiro Takenaga, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/891,177

(22) Filed: Jul. 15, 2004

(65) Prior Publication Data

US 2005/0013570 A1   Jan. 20, 2005

(30) Foreign Application Priority Data

| Jul. 18, 2003 | (JP) | ............................ 2003-199267 |
| Jul. 18, 2003 | (JP) | ............................ 2003-199268 |
| Oct. 2, 2003 | (JP) | ............................ 2003-344854 |

(51) Int. Cl.
*G02B 6/02* (2006.01)
*C03B 37/23* (2006.01)

(52) U.S. Cl. ...................... 385/124; 385/123; 385/141; 65/385; 65/397

(58) Field of Classification Search ................ 385/123, 385/124, 126, 127, 128, 141; 65/385, 397
See application file for complete search history.

(56) References Cited

U.S. PATENT DOCUMENTS

| 4,006,962 | A | | 2/1977 | Olshansky | ............... 385/124 X |
| 4,447,124 | A | | 5/1984 | Cohen | ..................... 385/124 X |
| 4,473,273 | A | | 9/1984 | Hodge | ..................... 385/124 X |
| 4,802,733 | A | * | 2/1989 | Bachmann et al. | ......... 385/123 |
| 4,804,247 | A | | 2/1989 | Kyoto et al. | .............. 385/124 X |
| 5,115,486 | A | | 5/1992 | Bader et al. | ............. 385/124 X |
| 5,911,025 | A | | 6/1999 | Garito et al. | ........... 385/124 X |
| 2002/0076157 | A1 | | 6/2002 | Kropp | ..................... 385/124 X |
| 2002/0197038 | A1 | | 12/2002 | Abbott, III et al. | ..... 385/124 X |
| 2005/0013570 | A1 | * | 1/2005 | Guan et al. | .................. 385/124 |
| 2005/0157995 | A1 | * | 7/2005 | Guan et al. | .................. 385/123 |

FOREIGN PATENT DOCUMENTS

| CN | 88100850 A | 9/1988 | ............. 385/124 X |
| CN | 1311456 A | 9/2001 | ............. 385/124 X |
| CN | 1415987 A | 5/2003 | ............. 385/124 X |

(Continued)

OTHER PUBLICATIONS

R. Olshansky, Propagation in glass optical waveguides, review of Modern Physics, vol. 51, No. 2., Apr. 1997.

(Continued)

*Primary Examiner*—Brian M. Healy
(74) *Attorney, Agent, or Firm*—Sughrue Mion, PLLC

(57) ABSTRACT

A graded-index multimode fiber includes a core containing fluorine and a cladding which is provided at an outer periphery of the core, and the fiber has a refractive index profile which satisfies the following Formula (1):

$$n(r) = \begin{cases} n_1\left[1 - 2\Delta\left(\frac{r}{a}\right)^\alpha\right]^{1/2} & (0 \leq r \leq a) \\ n_1(1 - 2\Delta)^{1/2} & (r > a) \end{cases} \quad (1)$$

where $n(r)$ is a refractive index of the optical fiber at a distance "r" from the center of the core, $n_1$ is a refractive index at the center of the core, $\Delta$ is a relative refractive index difference of the center of the core with respect to the cladding, "a" is a core radius, and $\alpha$ is a refractive index profile exponential parameter.

13 Claims, 30 Drawing Sheets

FOREIGN PATENT DOCUMENTS

| | | | | |
|---|---|---|---|---|
| EP | 1 059 546 A2 | 12/2000 | ............. | 385/124 X |
| GB | 2 100 464 A | 12/1982 | ............. | 385/124 X |

OTHER PUBLICATIONS

J.W. Fleming, "Material dispersion in lightguide glasses", Electron Lett., vol. 14, pp. 326-328, 1978.

L. Raddatz, I. H. White, D. G. Cummingham, and M.C. Nowell, An experimental and theoretical study of the offset launch technique for the enhancement of the bandwidth of multimode fiber links, J. Lightwave Technol., vol. 16, pp. 324-331, 1998.

K. Okamoto, "Comparison of calculated and measured impulse responses of optical fibers" Appl. Opt., vol. 18, pp. 2199-2206, 1979.

R. Olshansky and D. B. Keck, Pulse Broadening in Graded-index Optical Fibers, Appl. Opt., vol. 15, pp. 483-491, 1976.

N. Shibata and T. Edahiro, "Refractive-indexdispersion for $GeO_2$-, $P_2O_5$- and $B_2O_3$- doped silica glasses in optical fibers", Trans. IECE Japan vol. E65, pp. 166-172.

N. Shibata and T. Edahiro, "Refractive-indexdispersion for $GeO_2$-, $P_2O_5$- and $B_2O_3$-doped silica glasses in optical fibers",Trans. IECE Japan, vol. E65, pp. 166-172, 1982.

R. Olshansky and D. B. Keck, "Pulse Broadening in Graded-index Optical Fibers", Appl. Opt., vol. 15, pp. 483-491, 1976.

K. Okamoto, "Comparison of calculated and measured impulse responses of optical fibers", Appl. Opt., vol. 18, pp. 2199-2206, 1979.

L. Raddatz, I. H. White, D. G. Cunningham, and M. C. Nowell, "An experimental and theoretical study of the offset launch technique for the enhancement of the bandwidth of multimode fiber links", J. Lightwave Technol., vol. 16, pp. 324-331, 1998.

J. W. Fleming, "Material dispersion in lightguide glasses", Electron Lett., vol. 14, pp. 326-328, 1978.

R. Olshansky, "Propagation in glass optical waveguides", Review of Modern Physics, vol. 51, No. 2, Apr. 1979.

* cited by examiner

GRADED-INDEX MULTIMODE FIBER AND MANUFACTURING METHOD THEREFOR

Priority is claimed to Japanese Patent Application No. 2003-199267 filed Jul. 18, 2003; Japanese Patent Application No. 2003-199268, filed Jul. 18, 2003; and Japanese Patent Application No. 2003-344854, filed Oct. 2, 2003, the contents of which are incorporated herein by reference.

BACKGROUND OF THE INVENTION

1. Field of the Invention

The present invention relates to a graded-index multimode fiber.

2. Description of Related Art

A graded-index multimode fiber (hereinafter referred to as "GI multimode fiber"), which is one type of multimode fiber, is fabricated by doping at least one dopant, e.g., germanium (Ge), in the core thereof such that the doped core has a higher refractive index (sometimes simply referred to as "index") than the refractive index of pure silica. Such a GI fiber has a refractive index profile in which the refractive index is highest at the center of the core and continuously decreases toward the boundary between the core and the cladding, as the distance from the center of the core increases.

In a GI multimode fiber having such a configuration, since the light propagating in the outer regions can travel faster than the light propagating in the center region, differences in propagation rates among different modes are minimized, thereby reducing the modal dispersion and increasing transmission bandwidth.

Such a GI multimode fiber has a large numerical aperture, and has been widely used in a transmission line of an optical local area network (LAN). In order to meet a need for a faster optical LAN, techniques to control the refractive index profiles of GI multimode fibers have been researched.

However, further improvement in performance of GI multimode fibers seems almost impossible at present, and wavelength division multiplexing (WDM) is required for increasing transmission bandwidth of GI multimode fibers.

In a conventional GI multimode fiber which has a germanium-containing core, the optimum refractive index profile varies greatly depending on the wavelength of the light signal propagating through the fiber. Accordingly, since a fiber having a refractive index profile optimized at a certain wavelength provides a very small transmission bandwidth at other wavelengths, it cannot be used for wavelength division multiplexing (WDM), which has been discussed in literature, for example in R. Olshansky, "Propagation in glass optical waveguides", Reviews of Modem Physics, Vol. 51, No. 2, pp. 341–367, 1979).

In addition, chromatic dispersion caused by germanium is significant in wavelength regions far from the zero dispersion wavelength, e.g., the 0.85 μm region, making the transmission bandwidth very small.

SUMMARY OF THE INVENTION

The present invention was made in view of the above-mentioned background, and an object thereof is to provide a graded-index multimode fiber which provides a maximum transmission bandwidth at various wavelengths and which is free from any dependence on the wavelength of the signal light.

In order to solve the above-mentioned problems, a first exemplary embodiment of the present invention provides a graded-index multimode fiber which includes a core containing fluorine and a cladding which is provided at an outer periphery of the core. The graded-index multimode fiber has a refractive index profile which satisfies the following Formula (1):

$$n(r) = \begin{cases} n_1 \left[1 - 2\Delta \left(\frac{r}{a}\right)^\alpha\right]^{1/2} & (0 \le r \le a) \\ n_1 (1 - 2\Delta)^{1/2} & (r > a) \end{cases} \quad (1)$$

where $n(r)$ is a refractive index of the optical fiber at a distance "r" from the center of the core, $n_1$ is a refractive index of the center of the core, $\Delta$ is a relative refractive index difference of the center of the core with respect to the cladding, "a" is a core radius, and $\alpha$ is a refractive index profile exponential parameter.

In one aspect of the graded-index multimode fiber according to a first embodiment of the present invention, $\Delta$ may be no less than 0.005 and no more than 0.025, and a may be no less than 10 μm and no more than 35 μm.

In a second aspect of the graded-index multimode fiber according to a first embodiment of the present invention, a transmission bandwidth at wavelengths between 0.8 μm and 0.9 μm may be greater than 3 GHz·km.

In a third aspect of the graded-index multimode fiber according to a first embodiment of the present invention, a transmission bandwidth at the wavelength band of 1.3 μm may be greater than 1.5 GHz·km.

In order to solve the above-mentioned problems, a second exemplary embodiment of the present invention provides a graded-index multimode fiber which includes a core made of silica glass and a cladding which is provided at an outer periphery of the core. The graded-index multimode fiber has a refractive index profile which satisfies the following Formula (1):

$$n(r) = \begin{cases} n_1 \left[1 - 2\Delta \left(\frac{r}{a}\right)^\alpha\right]^{1/2} & (0 \le r \le a) \\ n_1 (1 - 2\Delta)^{1/2} & (r > a) \end{cases} \quad (1)$$

where $n(r)$ is a refractive index of the optical fiber at a distance "r" from the center of the core, $n_1$ is a refractive index at the center of the core, $\Delta$ is a relative refractive index difference of the center of the core with respect to the cladding, "a" is a core radius, and $\alpha$ is a refractive index profile exponential parameter.

The core contains a first substance which generally monotonically decreases the optimum value of the refractive index profile exponential parameter $\alpha$ in Formula (1) with an increase in wavelength, and at least one second substance which generally monotonically increase the optimum value of the refractive index profile exponential parameter $\alpha$ with an increase in wavelength. The optimum value of the refractive index profile exponential parameter $\alpha$ is optimized using the WKB method (Wentzel-Kramers-Brillouin method, R. Olshansky and D. B. Keck, "Pulse Broadening in Graded-index Optical Fibers", Appl. Opt., Vol. 15, pp. 483–491, 1976), such that a transmission bandwidth at an operating wavelength region is maximized.

In one aspect of the graded-index multimode fiber according to a second embodiment of the present invention, the first substance refractive index profile exponential parameter may be germanium, and the at least one second substance refractive index profile exponential parameter may be fluorine.

The present invention also provides a method for fabricating a graded-index multimode fiber which comprises a core made of silica glass and a cladding which is provided at an outer periphery of the core. The graded-index multimode fiber has a refractive index profile which satisfies the following Formula (1):

$$n(r) = \begin{cases} n_1 \left[1 - 2\Delta\left(\frac{r}{a}\right)^\alpha\right]^{1/2} & (0 \leq r \leq a) \\ n_1(1 - 2\Delta)^{1/2} & (r > a) \end{cases} \quad (1)$$

where n(r) is a refractive index of the optical fiber at a distance "r" from the center of the core, $n_1$ is a refractive index at the center of the core, $\Delta$ is a relative refractive index difference of the center of the core with respect to the cladding, "a" is a core radius, and $\alpha$ is a refractive index profile exponential parameter. The method comprises doping the core with a first substance which generally monotonically decreases the optimum value of the refractive index profile exponential parameter $\alpha$ with an increase in wavelength and with a second substance which generally monotonically increases the optimum value of the refractive index profile exponential parameter $\alpha$ in Formula (1) with an increase in wavelength. The optimum value of the refractive index profile exponential parameter $\alpha$ is optimized using the WKB method so that a transmission bandwidth at an operating wavelength region is maximized.

In order to solve the above-mentioned problems, a third exemplary embodiment of the present invention provides a graded-index multimode fiber including a core made of silica glass and a cladding which is provided at an outer periphery of the core The core contains phosphorus and fluorine.

The graded-index multimode fiber according to one aspect of a third embodiment of the present invention may have a refractive index profile which satisfies the following Formula (1):

$$n(r) = \begin{cases} n_1 \left[1 - 2\Delta\left(\frac{r}{a}\right)^\alpha\right]^{1/2} & (0 \leq r \leq a) \\ n_1(1 - 2\Delta)^{1/2} & (r > a) \end{cases} \quad (1)$$

where n(r) is a refractive index of the optical fiber at a distance "r" from the center of the core, $n_1$ is a refractive index at the center of the core, $\Delta$ is a maximum relative refractive index difference of a core with respect to the cladding, "a" is a core radius, and $\alpha$ is a refractive index profile exponential parameter.

In a second aspect of the graded-index multimode fiber according to a third embodiment of the present invention, the maximum relative refractive index difference of the core with respect to the cladding $\Delta$ may be expressed by the following Formula (2):

$$\Delta = \Delta_P + \Delta_F \quad (2)$$

where $\Delta_P$ is a relative refractive index difference of phosphorus with respect to the cladding, and $\Delta_F$ is a relative refractive index difference of fluorine with respect to the cladding.

In a third aspect of the graded-index multimode fiber according to a third embodiment of the present invention, the maximum relative refractive index difference $\Delta$ may be not less than about 0.005 and not more than about 0.025, the relative refractive index difference of phosphorus with respect to the cladding $\Delta_P$ may be not less than about 0 and not more than the maximum relative refractive index difference $\Delta$, and the relative refractive index difference of fluorine $\Delta_F$ may be not less than about 0 and not more than the maximum relative refractive index difference $\Delta$.

In a fourth aspect of the graded-index multimode fiber according to a third embodiment of the present invention, the maximum relative refractive index difference $\Delta$ may be not less than about 0.005 and not more than about 0.025, and the core radius "a" may be not less than about 10 μm and not more than about 35 μm.

In a fifth aspect of the graded-index multimode fiber according to a third embodiment of the present invention, the maximum relative refractive index difference $\Delta$ may be about 0.009 or greater, the numerical aperture may be about 0.185 or greater, and the transmission bandwidth may be greater than about 2 GHz·km at wavelengths between about 0.8 μm and 1.4 μm.

In a sixth aspect of the graded-index multimode fiber according to a third embodiment of the present invention, the maximum relative refractive index difference $\Delta$ may be about 0.019 or greater, the numerical aperture may be about 0.26 or greater, and the transmission bandwidth may be greater than about 1.5 GHz·km at wavelengths between about 0.8 μm and 1.4 μm.

The graded-index multimode fiber according to a third embodiment of the present invention provides a large transmission bandwidth in a wider wavelength range since the core is doped with phosphorus and fluorine. This makes the graded-index multimode fiber of the present invention suitable for transmission employing wavelength division multiplexing (WDM).

BRIEF DESCRIPTION OF THE DRAWINGS

These and other features, aspects, and advantages of the present invention will become better understood with reference to the following description and accompanying drawings, which should not be read to limit the invention in any way, in which.

DETAILED DESCRIPTION OF THE INVENTION (First Embodiment)

A first exemplary embodiment of the present invention will be described in detail.

Figure 37:
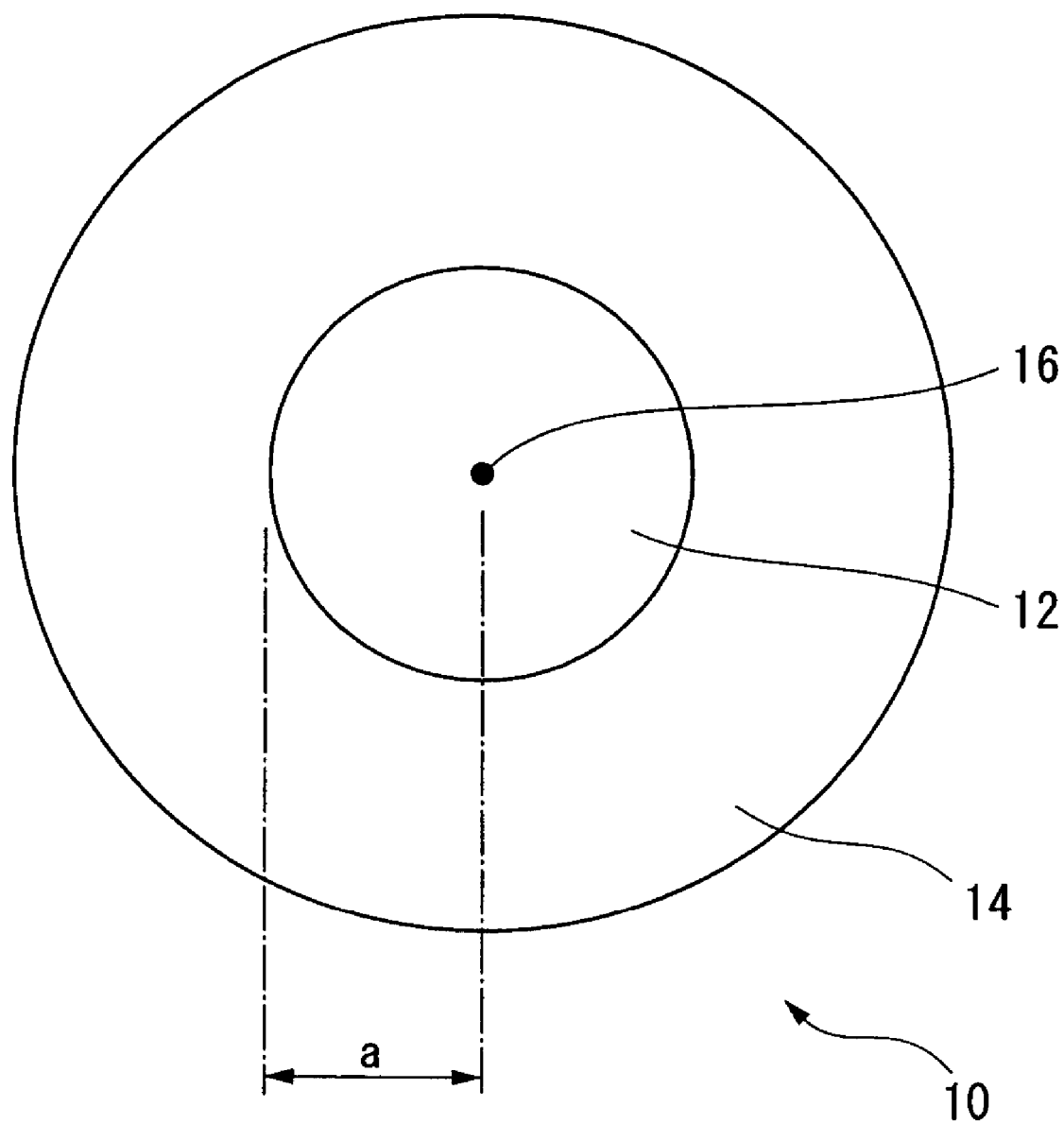
FIG. 37 is a schematic cross-sectional view showing an example of the GI multimode fiber according to the present invention.
Figure 38:
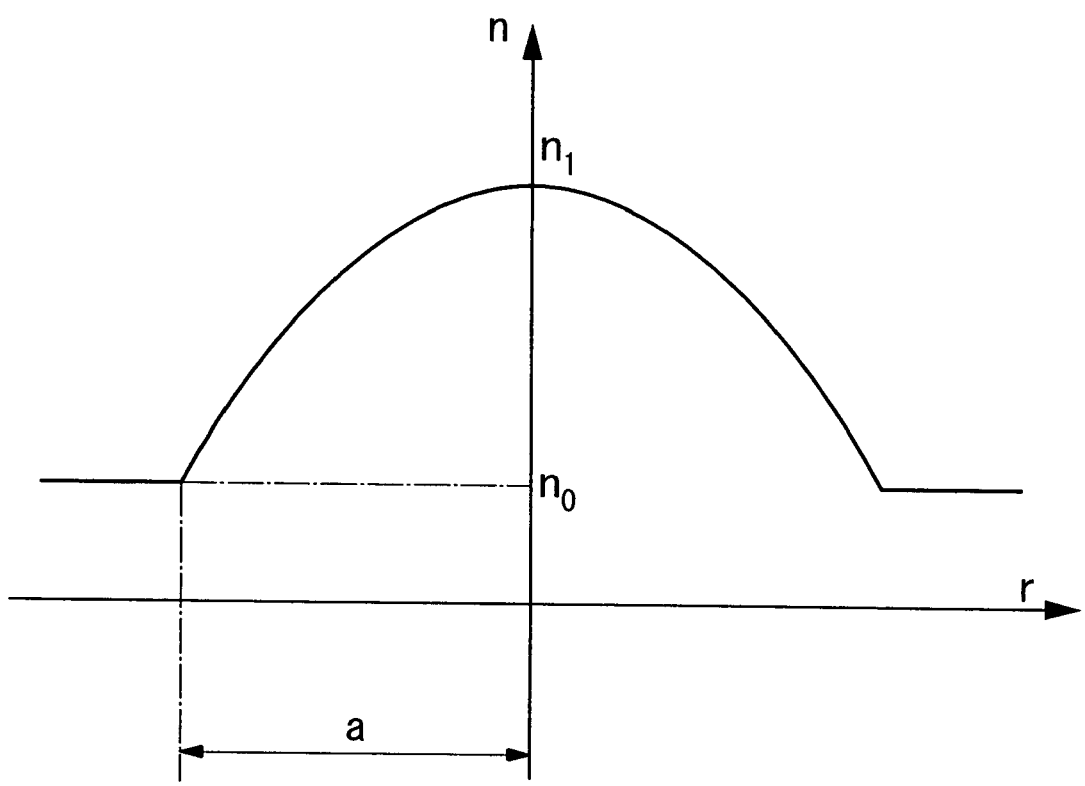
FIG. 38 shows an example of a refractive index distribution profile of the GI multimode fiber according to the present invention.

FIG. 37 is a schematic cross-sectional view showing an example of a GI multimode fiber 10 according to the first embodiment of the present invention. FIG. 38 shows an example of a refractive index distribution profile of the GI multimode fiber 10 according to the first embodiment of the present invention. It is not intended, however, that these figures show the actual dimension of the GI multimode fibers of the present invention, or the actual value of the refractive index thereof, or the actual shape of the profile curve thereof. The GI multimode fiber 10 according to the first embodiment of the present invention is an optical fiber which includes a core 12 made of silica glass containing fluorine (F) provided the center, and a cladding 14 which is provided concentrically surrounding the core 12. The fiber has a refractive index profile which satisfies the following Formula (1):

$$n(r) = \begin{cases} n_1 \left[ 1 - 2\Delta \left( \frac{r}{a} \right)^\alpha \right]^{1/2} & (0 \leq r \leq a) \\ n_1 (1 - 2\Delta)^{1/2} & (r > a) \end{cases} \quad (1)$$

where n(r) is a refractive index of the optical fiber at a distance "r" from the center of the core 16, $n_1$ is a refractive index at the center of the core 16, $\Delta$ is a relative refractive index difference of the center of the core 16 with respect to the cladding 14, "a" is a core radius, and $\alpha$ is a refractive index profile exponential parameter. $n_0$ is a is a refractive index of the cladding 14.

Although the refractive index profile exponential parameter $\alpha$ is adjusted such that a maximum transmission bandwidth is obtained at a desired wavelength, the optimum value $\alpha_{apt}$ of the refractive index profile exponential parameter varies depending on the dopant doped into silica glass.

The refractive index profile of a GI multimode fiber 10 of the present invention, which is represented by Formula (1), is shaped such that once the refractive index profile is highest at the center of the core 16, it gradually decreases with an increase in distance from the center. Therefore, signal light propagating through the GI multimode fiber 10 in a lower order mode travels a shorter distance but at a slower rate. In contrast, signal light propagating in a higher order mode travels a longer distance but at a higher rate near the boundary between the core 12 and the cladding 14 where the refractive index is smaller.

Accordingly, by changing the value of $\alpha$ which determines the shape of the profile, the difference in arrival time at which light signals at various modes propagating through the GI multimode fiber 10 reach the output port can be minimized. With a properly selected $\alpha$, the modal dispersion becomes the theoretical minimum, providing the maximum transmission bandwidth at the wavelength of signal light.

On the other hand, the optimum value $\alpha_{opt}$ of a changes depending on the wavelength employed. Furthermore, this change is affected by the one or more dopants doped into the core 12 and by the concentration of the one of more dopants. When a single dopant is used, the dopant can be classified into one of two types: Substance A or Substance B. The optimum value $\alpha_{opt}$ of a fiber doped with Substance A generally decreases with an increase in wavelength, whereas the $\alpha_{opt}$ of a fiber doped with Substance B increases with an increase in wavelength.

Fluorine is distributed in the core 12 such that the concentration of fluorine gradually increases from the center toward the outside, thereby causing a gradual decrease in the refractive index. The refractive index decreases substantially linearly with an increase in fluorine concentration.

The cladding 14 is made of silica glass doped with fluorine at a constant concentration which equals the maximum concentration of fluorine in the core 12.

The amount of fluorine contained in the cladding 14 is preferably, but not necessarily, between about 2 atom % and about 10 atom %, and is more preferably, but not necessarily, between about 2 atom % and about 4 atom %.

In the GI multimode fiber 10 according to the first embodiment of the present invention, the refractive index profile exponential parameter $\alpha$ in Formula (1), representing the refractive index profile of a GI multimode fiber, is optimized using the WKB (Wentzel-Kramers-Brillouin method, R. Olshansky and D. B. Keck, "Pulse Broadening in Graded-index Optical Fibers", Appl. Opt., Vol. 15, pp. 483–491, 1976) method and is controlled to the optimum value ($\alpha_{opt}$) so that the transmission bandwidth at an operating wavelength region is maximized at a desired wavelength. The optimum value $\alpha_{opt}$ of the refractive index profile exponential parameter $\alpha$ of the GI multimode fiber 10 of the present invention has a quite low variance within an overall wavelength range, and thus exhibits very little wavelength dependence.

In the GI multimode fiber 10 according to the first embodiment of the present invention, the refractive index profile exponential parameter $\alpha$ in Formula (1) is preferably, but not necessarily, no less than 1.98 and no more than 2.1, and is more preferably, but not necessarily, no less than 2.00 and no more than 2.07. The optimum value $\alpha_{opt}$ of the refractive index profile exponential parameter $\alpha$ described above falls within this range.

If a refractive index profile exponential parameter $\alpha$ is less than 1.98, a becomes smaller than the optimum value $\alpha_{opt}$ and higher order modes propagate faster than lower order modes. In contrast, if $\alpha$ is greater than 2.1, $\alpha$ becomes greater than the optimum value $\alpha_{opt}$ and higher order modes propagate slower than lower order modes, reducing the transmission bandwidth.

Furthermore, in the GI multimode fiber 10 according to the first embodiment of the present invention, the core radius "a" in Formula (1) is preferably, but not necessarily, no less than 10 μm and no more than 35 μm, and is more preferably, but not necessarily, no less than 20 μm and no more than 30 μm.

If the core radius "a" is less than 10 μm, it becomes difficult to couple fibers or to couple a fiber and a light source. In contrast, if a core radius "a" is greater than 35 μm, too many modes are generated, causing an increased modal dispersion and reducing the transmission bandwidth.

In the GI multimode fiber 10 according to the first embodiment of the present invention, since the refractive index profile exponential parameter $\alpha$ in Formula (1), which represents the refractive index profile of the fiber, is adjusted to the optimum value, the optimum value $\alpha_{opt}$ of the refractive index profile exponential parameter $\alpha$ exhibits very little wavelength dependence. Accordingly, even a GI multimode fiber which is fabricated by optimizing a at a certain wavelength for obtaining the maximum transmission bandwidth provides a large transmission bandwidth within almost the entire wavelength range.

For example, by optimizing α so that the maximum transmission bandwidth obtained at a short wavelength, a GI multimode fiber containing fluorine, can have a far wider transmission bandwidth in a long wavelength region compared to a conventional GI multimode fiber doped with germanium.

Furthermore, the GI multimode fiber 10 according to the first embodiment of the present invention has a transmission bandwidth of greater than 3 GHz·km at wavelengths between 0.8 μm and 0.9 μm. A transmission bandwidth is defined as a product of a possible transmission rate and a length of an optical fiber, representing the transmission capacity of the optical fiber.

Therefore, the GI multimode fiber 10 according to the first embodiment of the present invention has a high transmission rate in a wavelength range between 0.8 μm and 0.9 μm, enabling a wavelength division multiplexing (WDM) transmission.

Furthermore, the GI multimode fiber 10 according to the first embodiment of the present invention has a transmission bandwidth of greater than 1.5 GHz·km at a wavelength band of 1.3 μm.

Accordingly, the GI multimode fiber 10 of the present invention enables a high rate wavelength division multiplexing (WDM) transmission at the 1.3 μm band at a broadband wavelength region which meets the requirement of a high-rate optical LAN.

Furthermore, a transmission bandwidth of the GI multimode fiber 10 according to the first embodiment of the present invention is greater than a conventional GI multimode fiber containing germanium in the core thereof since fluorine, the dopant, generates a smaller chromatic dispersion than germanium.

Furthermore, the GI multimode fiber 10 of the present invention has a smaller transmission loss than a conventional GI multimode fiber containing germanium in the core thereof.

Fabrication of a GI multimode fiber 10 of the first embodiment of the present invention will now be described.

A preform of the GI multimode fiber 10 of the first embodiment of the present invention is fabricated using a PCVD (plasma chemical vapor deposition) or MCVD (modified plasma chemical vapor deposition) method by precisely controlling the amount of fluorine so that the fluorine concentration increases gradually from the center toward the outside to obtain a desired refractive index profile. A GI multimode fiber 10 is formed by drawing the obtained preform under high temperature conditions.

The first embodiment of the present invention will now be described in greater detail using examples. It is not intended, however, that the present invention be limited to the examples described.

EXAMPLE 1

GI multimode fibers 10, including a core 12 made of silica glass doped with fluorine of between 0 atom % and 2.8 atom % and a cladding 14 made of silica glass doped with 2.8 atom % fluorine concentrically surrounding the core 12, were fabricated.

Figure 1:
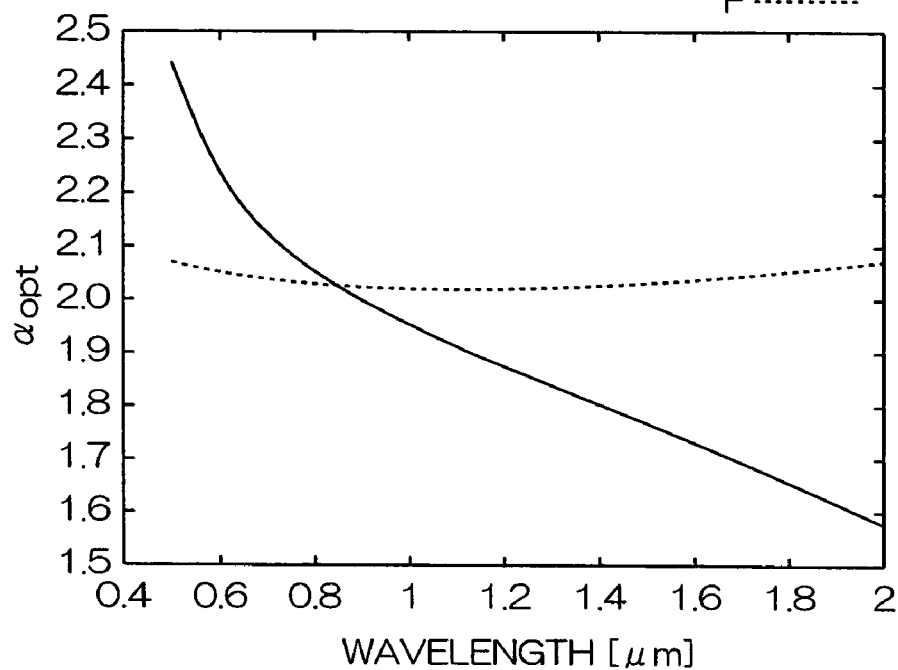
FIG. 1 is a graph showing a wavelength dependence of the optimum value $\alpha_{opt}$ of the refractive index profile exponential parameter $\alpha$ calculated using the WKB method in Formula (1) which presents the refractive index profiles of GI multimode fiber of Example 1 and Comparative Example 1 which are doped with germanium ($GeO_2$) or fluorine (F), respectively.

The optimum value $\alpha_{opt}$ of the refractive index profile exponential parameter α calculated using the WKB method in Formula (1), which represents the refractive index profile of the GI multimode fibers 10, was determined at various wavelengths to characterize the wavelength dependence. The result is shown in FIG. 1.

COMPARATIVE EXAMPLE 1

GI multimode fibers 10, including a core 12 made of silica glass doped with 13.2 mole % of germanium and a cladding 14 made of silica glass concentrically surrounding the core 12, were fabricated.

The optimum value αopt of the refractive index profile exponential parameter α calculated using the WKB method in Formula (1), which represents the refractive index profile of the GI multimode fiber, was determined at various wavelengths to characterize the wavelength dependence. The result is shown in FIG. 1.

The results shown in FIG. 1 confirmed that in the GI multimode fibers in Example 1, the optimum value $\alpha_{opt}$ of the refractive index profile exponential parameters a is the smallest near the wavelength of 1.1 μm, and that the deviation of $\alpha_{opt}$ is quite low, exhibiting almost no wavelength dependence. Accordingly, even when α, of the GI multimode fibers of Example 1, are optimized at a certain wavelength, the fibers provide a large transmission bandwidth within almost the entire wavelength range.

In contrast, the optimum value $\alpha_{opt}$ of GI multimode fibers of Comparative Example 1 monotonically decreases with an increase in wavelength.

In particular, the deviation of $\alpha_{opt}$ of the GI multimode fibers of Comparative Example 1 is high at a short wavelength region of 0.85 μm which is stipulated in the 10 GbE (IEC 60793-2-10 Ed 2.0) standard, making the fibers inadequate for wavelength division multiplexing (WDM) at this wavelength region. In addition, the deviation of $\alpha_{opt}$ is lower in a long wavelength region of 1.30 μm than in the short wavelength region, so the difference of $\alpha_{opt}$ between the short and long wavelength regions is quite large. Accordingly, if the GI multimode fibers 10 of Comparative Example 1 are optimized for a short wavelength region, a transmission bandwidth will be smaller in a long wavelength region.

EXAMPLE 2

GI multimode fibers 10, including a core 12 made of silica glass doped with fluorine of between 0 atom % and 2.8 atom % and a cladding 14 made of silica glass doped with 2.8 atom % fluorine concentrically surrounding the core 12, were fabricated.

The relative refractive index difference Δ of the GI multimode fibers 10 with respect to the cladding 14 at the center of the core 16 was adjusted to 0.01, and the core radius "a" was set to 25 μm.

Figure 2:
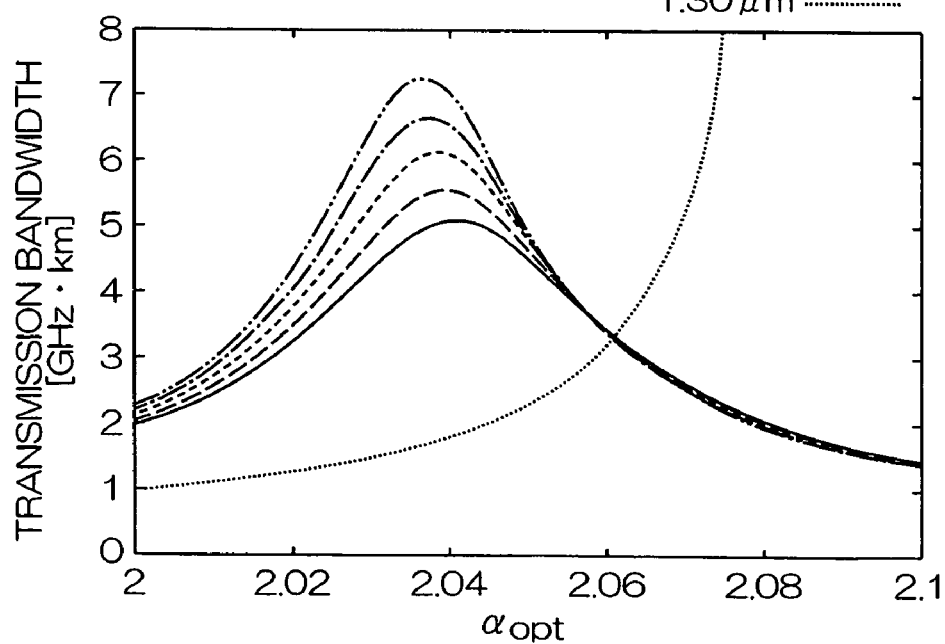
FIG. 2 is a graph illustrating the relationship between the transmission bandwidth of the GI multimode fiber of Example 2 and the optimum value $\alpha_{opt}$ of the refractive index profile exponential parameter $\alpha$ in Formula (1) which represents the refractive index profile of the GI multimode fiber.

Transmission bandwidths and the optimum value $\alpha_{opt}$ of the refractive index profile exponential parameter α, calculated using the WKB method in Formula (1), presenting the refractive index profiles of the GI multimode fibers 10, were determined to characterize the relationship between the transmission bandwidth and $\alpha_{opt}$. It is assumed that the pulse full width at half maximum (FWHM) of the incident light is 1 ns, the RMS (root mean square) spectrum is 0.35 nm, and the FWHM beam size of the incident light is 50 μm at wavelengths between 0.81 μm and 0.89 μm; and that the FWHM of the incident light is 1 ns, the RMS spectrum is 1.3 nm, and the FWHM beam size of the incident light is 50 μm at a wavelength of 1.30 μm. The results are shown in FIG. 2.

COMPARATIVE EXAMPLE 2

GI multimode fibers 10, including a core 12 made of silica glass doped with germanium of between 0 mole % and 13.2 mole % and a cladding 14 made of silica glass concentrically surrounding the core 12, was fabricated.

The relative refractive index difference Δ of the GI multimode fibers 10 with respect to the cladding 14 at the center of the core 16 was adjusted to 0.01, and the core radius "a" was set to 25 μm.

Transmission bandwidths and optimum values $\alpha_{opt}$ of the refractive index profile exponential parameter α, calculated using the WKB method in Formula (1), presenting the refractive index profile of the GI multimode fibers, were determined to characterize the relationship between the transmission bandwidth and $\alpha_{opt}$. It is assumed that the pulse full width at half maximum (FWHM) of the incident light is 1 ns, the RMS (root mean square) spectrum is 0.35 nm, and the FWHM beam size of the incident light is 50 μm at wavelengths between 0.81 μm and 0.89 μm; and that the FWHM of the incident light is 1 ns, the RMS spectrum is 1.3 nm, and the FWHM beam size of the incident light is 50 μm at a wavelength of 1.30 μm. The results are shown in FIG. 3.

The results of FIG. 2 indicated that the deviation of the optimum value apt of the refractive index profile exponential parameter α is low at various wavelengths in the GI multimode fibers of Example 2. Therefore, the GI multimode fibers of Example 2 have the optimum values $\alpha_{opt}$ which provide a large transmission bandwidth at the entire wavelength range between 0.81 μm and 0.89 μm.

Figure 3:
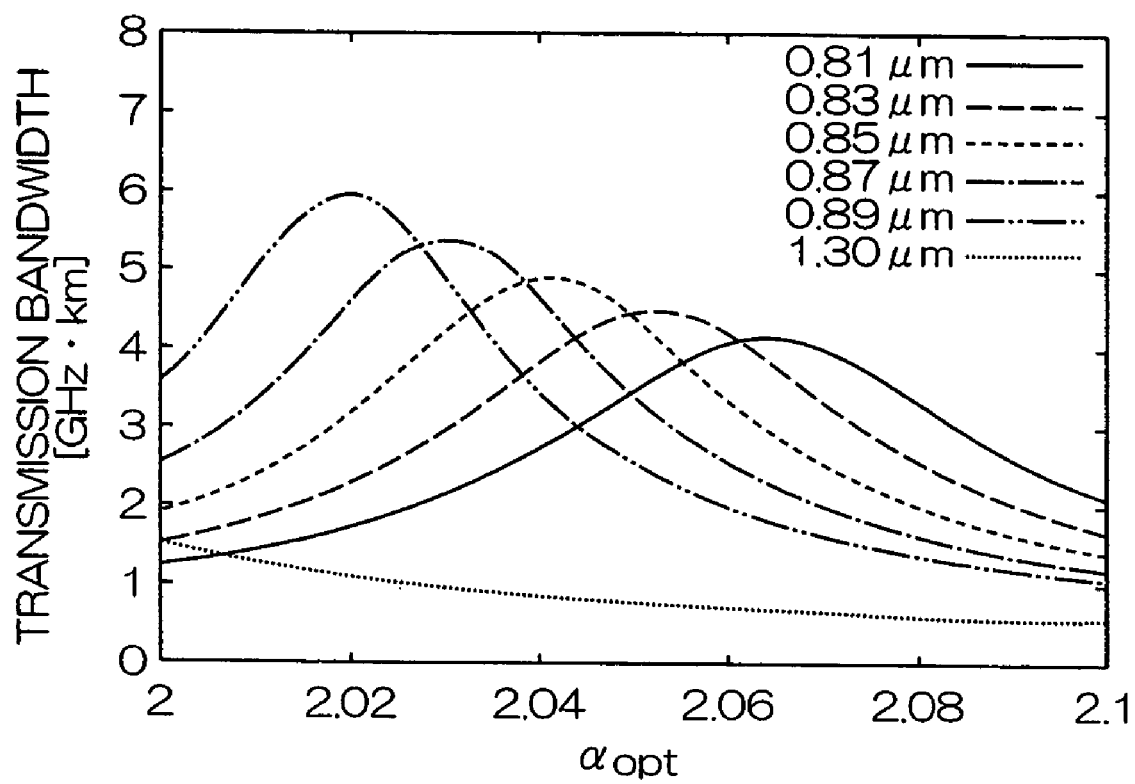
FIG. 3 is a graph illustrating the relationship between the transmission bandwidth of the GI multimode fiber of Comparative Example 2 and the optimum value $\alpha_{opt}$ of the refractive index profile exponential parameter $\alpha$ in Formula (1) which represents the refractive index profile of the GI multimode fiber.

In contrast, the results shown in FIG. 3 confirmed that the optimum values $\alpha_{opt}$ of the refractive index profile exponential parameter α decrease with an increase in wavelength in the GI multimode fibers of Comparative Example 2. Therefore, for wavelength division multiplexing (WDM) using the GI multimode fibers of Comparative Example 2 in the wavelength range between 0.81 μm and 0.89 μm, the minimum transmission bandwidths should be adjusted to a far smaller value than those of the GI multimode fibers of Example 2.

Furthermore, FIGS. 2 and 3 confirmed that when $\alpha_{opt}$ is set to, for example, 2.04, the transmission bandwidth of the GI multimode fibers of Example 2 is two or more times greater than the GI multimode fibers of Comparative Example 2 at a wavelength of 1.30 μm. This is because the chromatic dispersion of fluorine is smaller than germanium, in addition to a small deviation of the optimum value $\alpha_{opt}$ in a GI multimode fiber doped with fluorine.

EXAMPLE 3

GI multimode fibers 10, including a core 12 made of silica glass doped with fluorine of between 0 atom % and 2.8 atom % and a cladding 14 made of silica glass doped with 2.8 atom % fluorine concentrically surrounding the core 12, was fabricated.

The relative refractive index difference Δ of the GI multimode fibers with respect to the cladding 14 at the center of the core 16 was adjusted to 0.01, and the core radius "a" was set to 25 μm. Then the GI multimode fibers 10 was optimized at a wavelength of 0.85 μm, and the refractive index profile exponential parameter α in Formula (1), which represents a refractive index profile of GI multimode fibers 10, was adjusted to 2.038.

Figure 4:
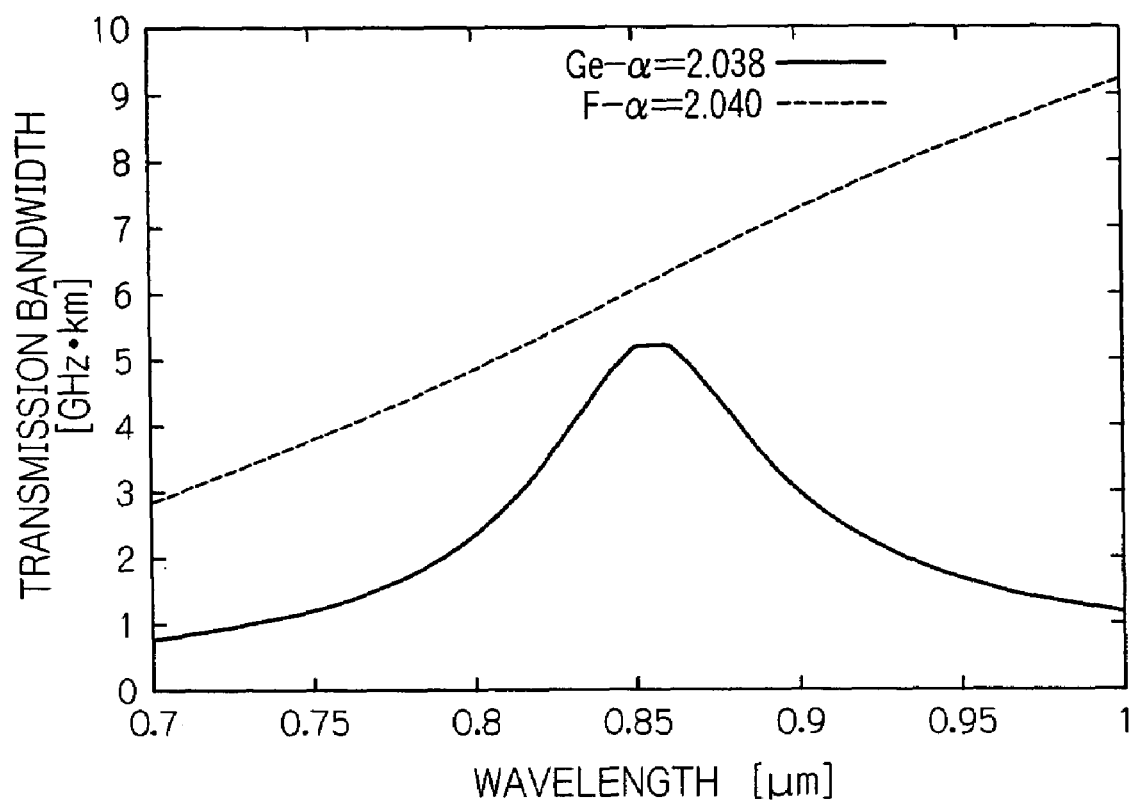
FIG. 4 is a graph illustrating the relationship between the transmission bandwidth of GI multimode fiber of Example 3 and Comparative Example 3 and wavelength.
Figure 5:
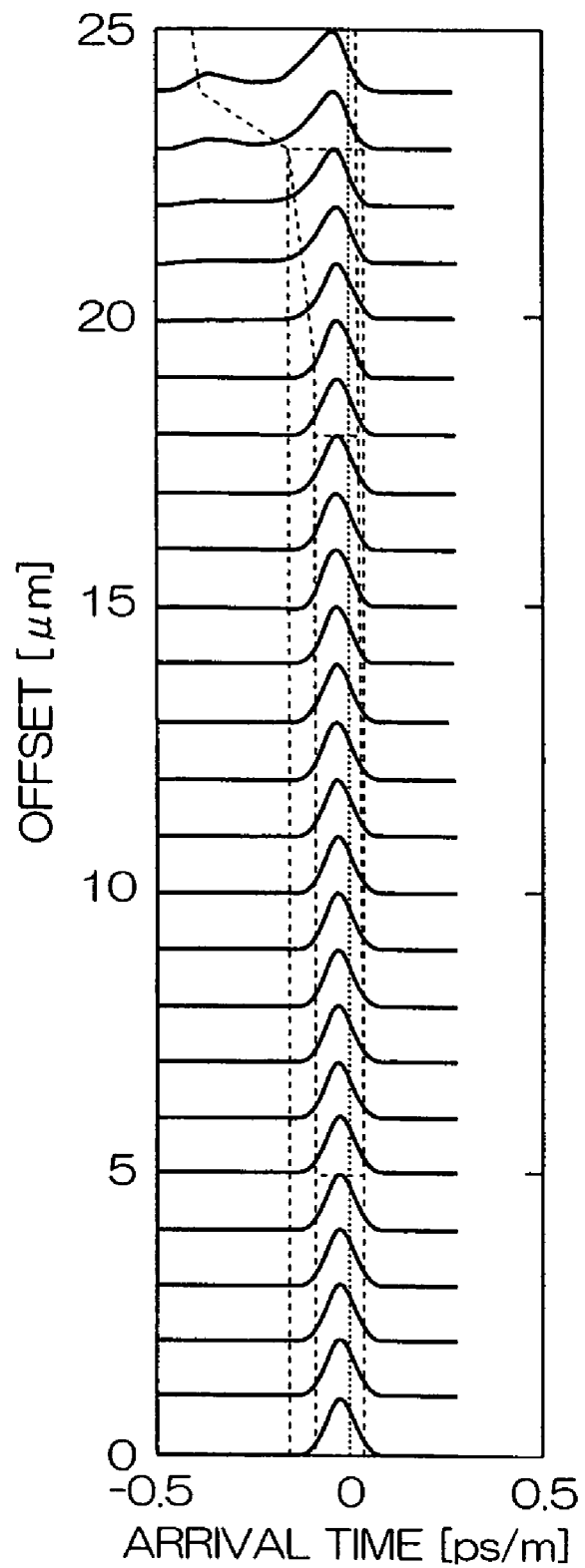
FIG. 5 is a graph illustrating the DMD characteristics of the GI multimode fiber of Example 4 at a wavelength of 0.81 µm.
Figure 6:
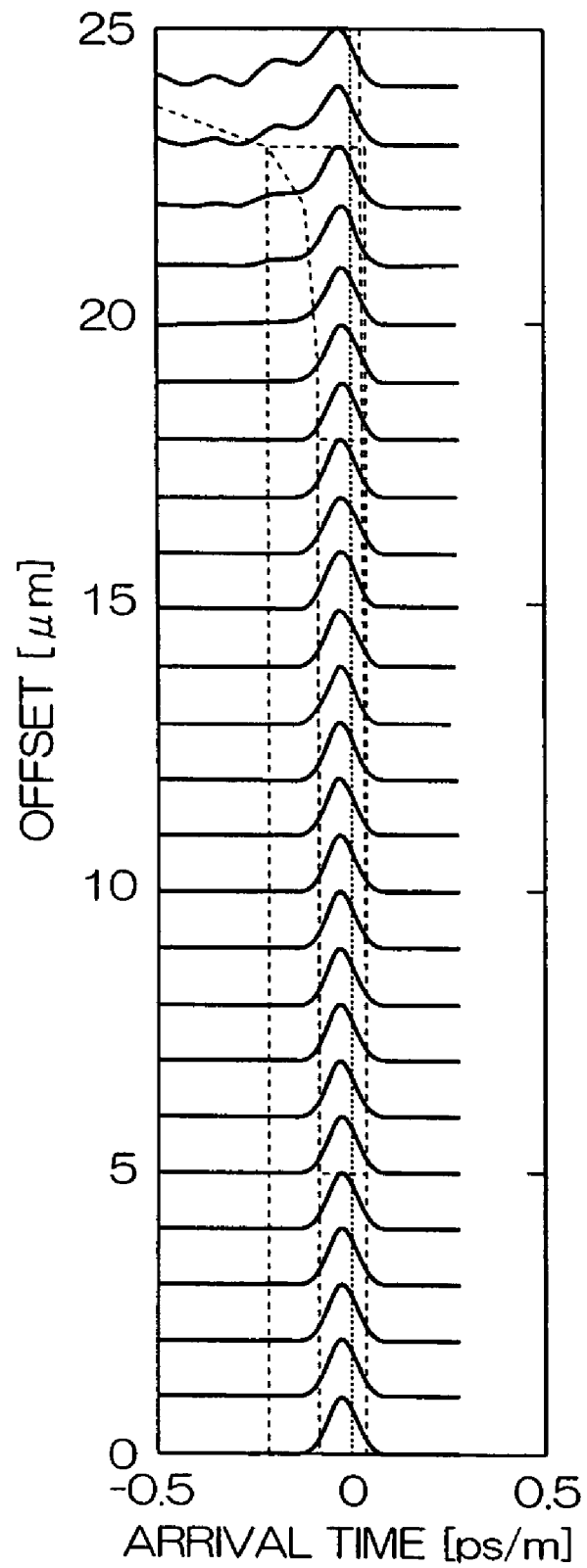
FIG. 6 is a graph illustrating the DMD characteristics of the GI multimode fiber of Example 4 at a wavelength of 0.83 µm.
Figure 7:
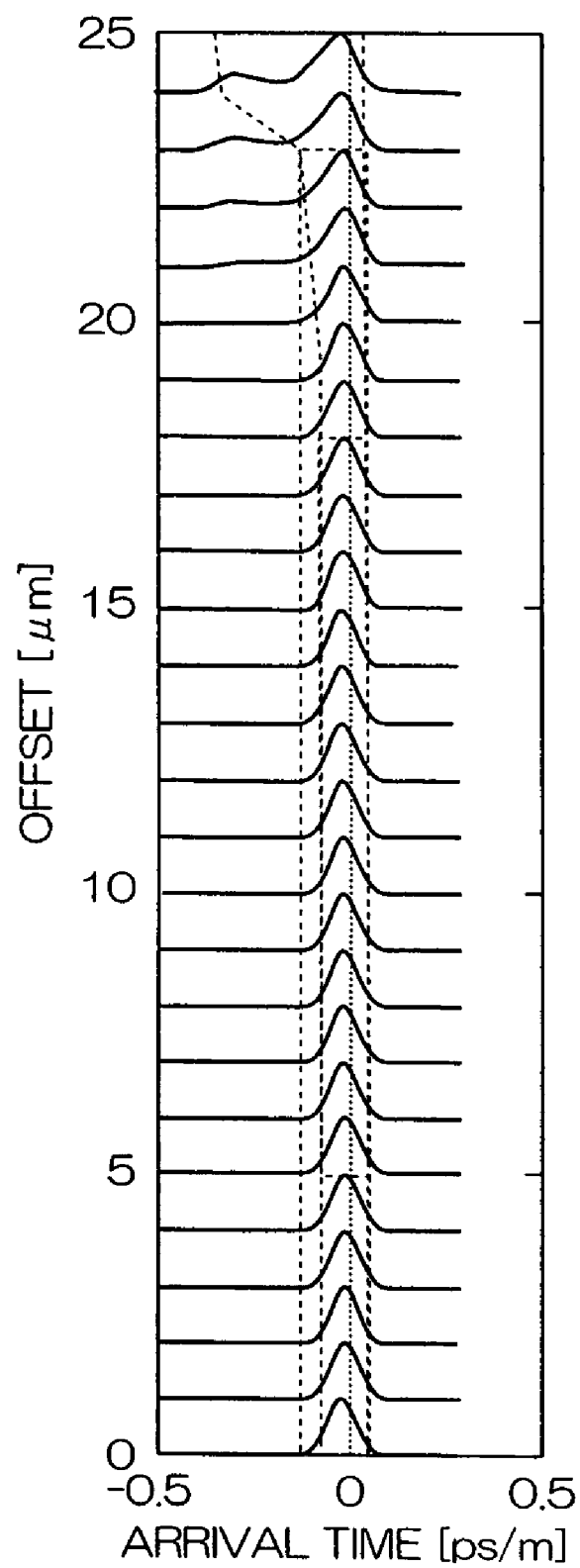
FIG. 7 is a graph illustrating the DMD characteristics of the GI multimode fiber of Example 4 at a wavelength of 0.85 µm.
Figure 8:
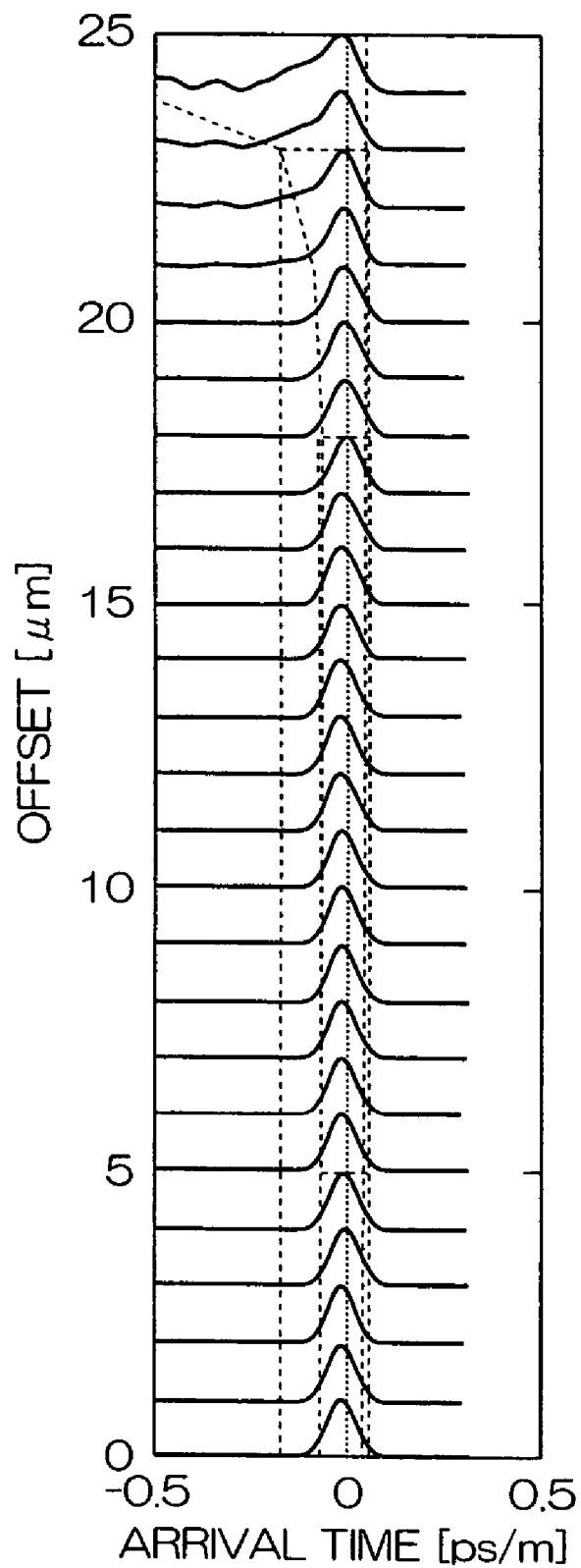
FIG. 8 is a graph illustrating the DMD characteristics of the GI multimode fiber of Example 4 at a wavelength of 0.87 µm.
Figure 9:
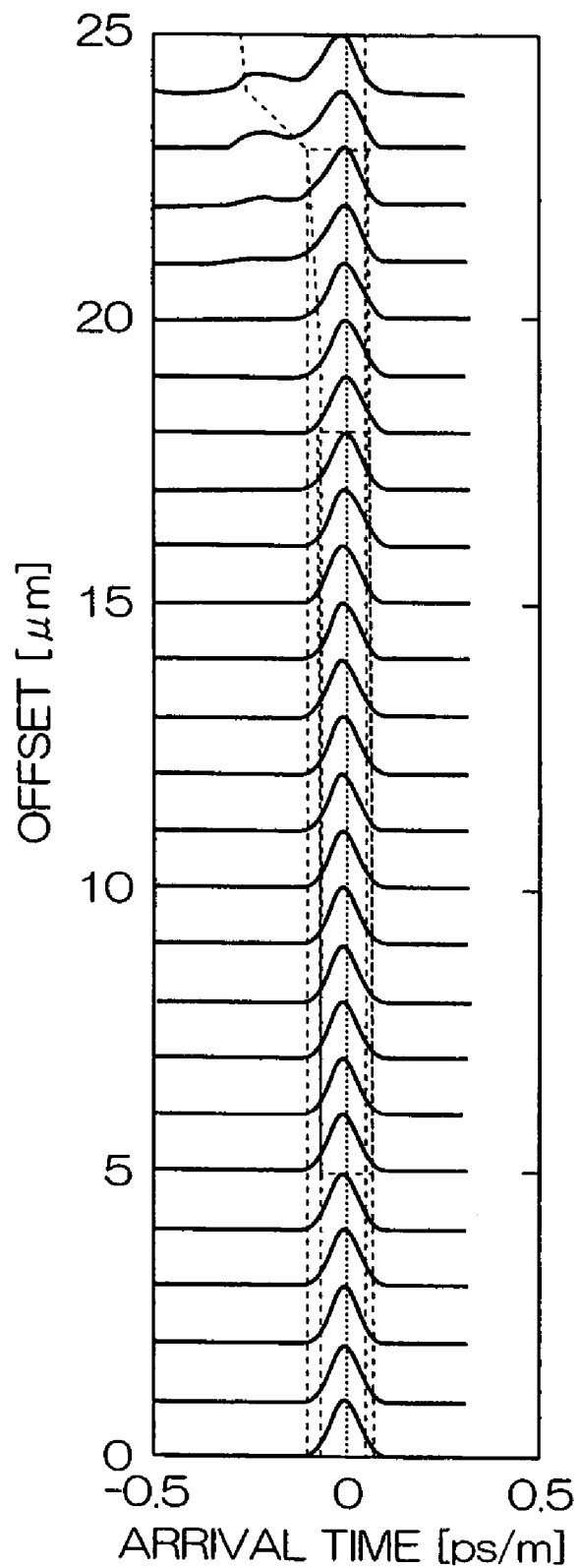
FIG. 9 is a graph illustrating the DMD characteristics of the GI multimode fiber of Example 4 at a wavelength of 0.89 µm.
Figure 10:
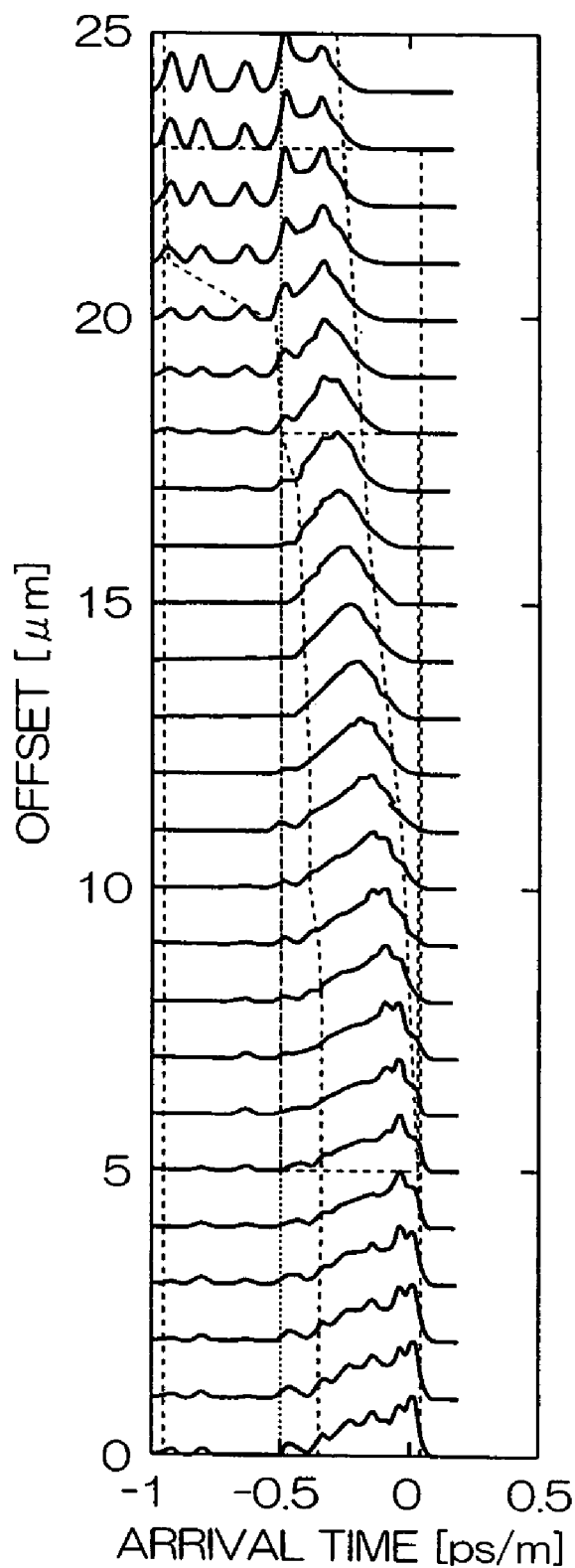
FIG. 10 is a graph illustrating the DMD characteristics of the GI multimode fiber of Example 4 at a wavelength of 1.30 µm.
Figure 11:
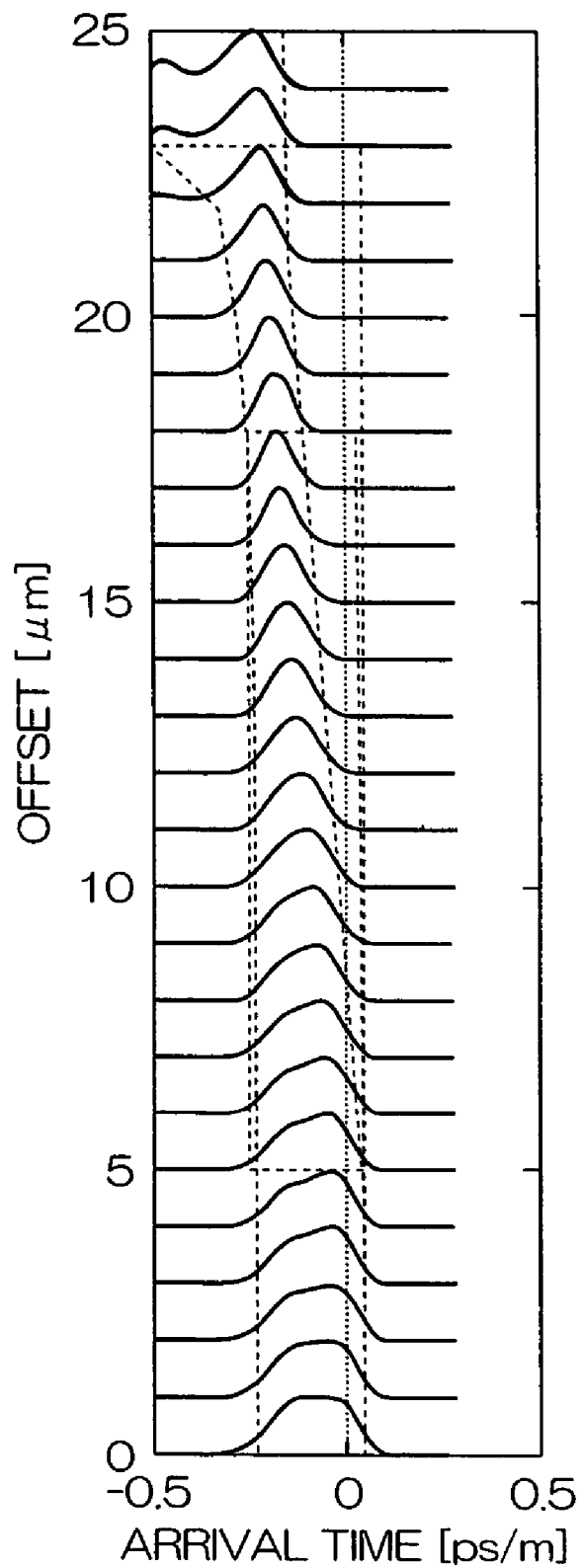
FIG. 11 is a graph illustrating the DMD characteristics of the GI multimode fiber of Comparative Example 4 at a wavelength of 0.81 µm.
Figure 12:
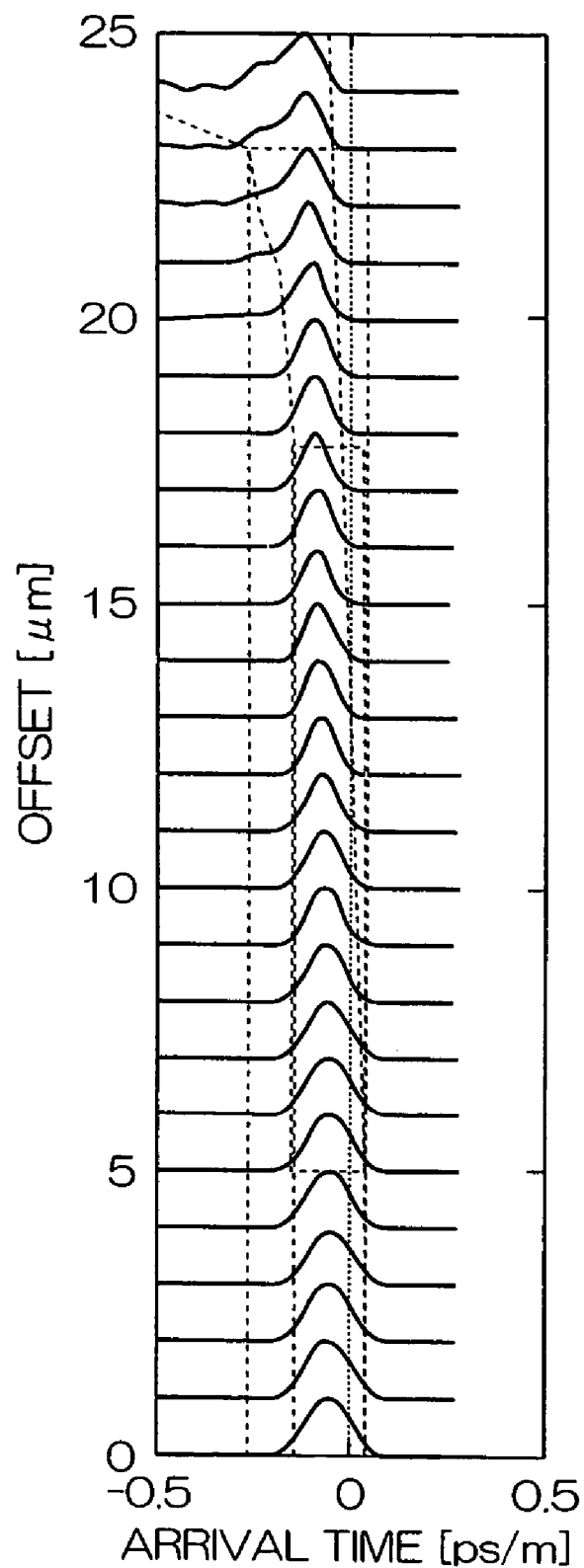
FIG. 12 is a graph illustrating the DMD characteristics of the GI multimode fiber of Comparative Example 4 at a wavelength of 0.83 µm.
Figure 13:
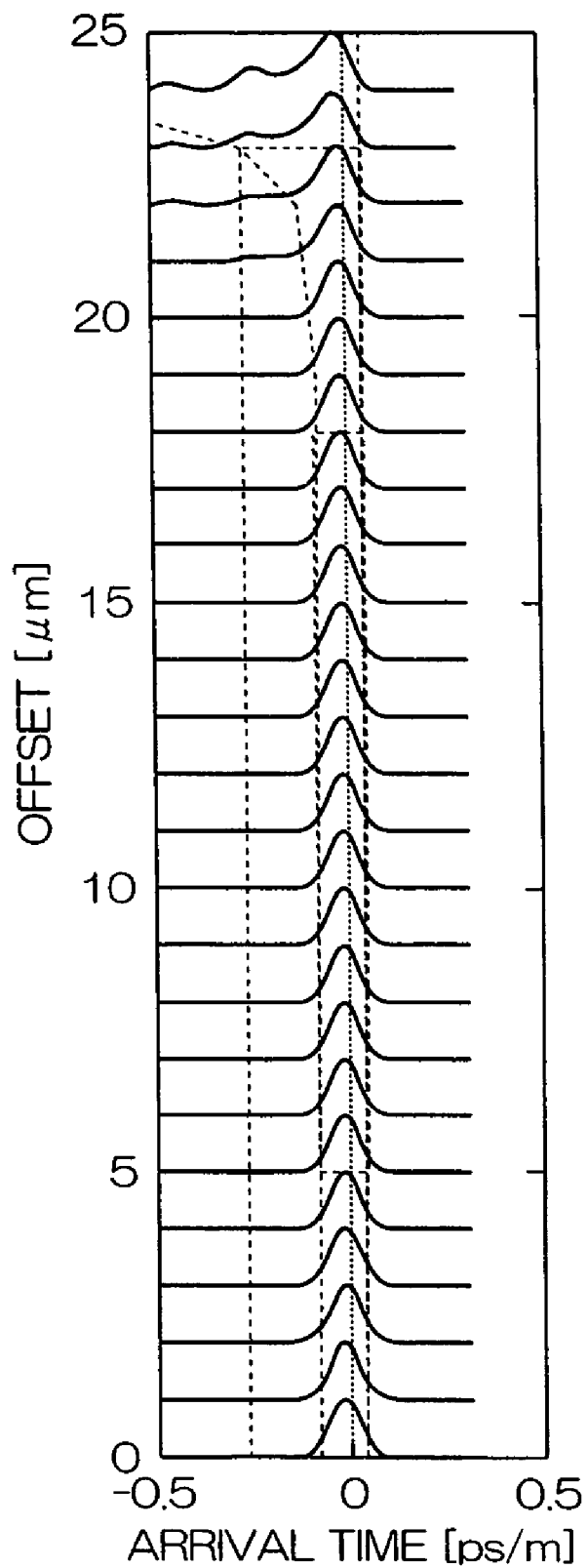
FIG. 13 is a graph illustrating the DMD characteristics of the GI multimode fiber of Comparative Example 4 at a wavelength of 0.85 µm.
Figure 14:
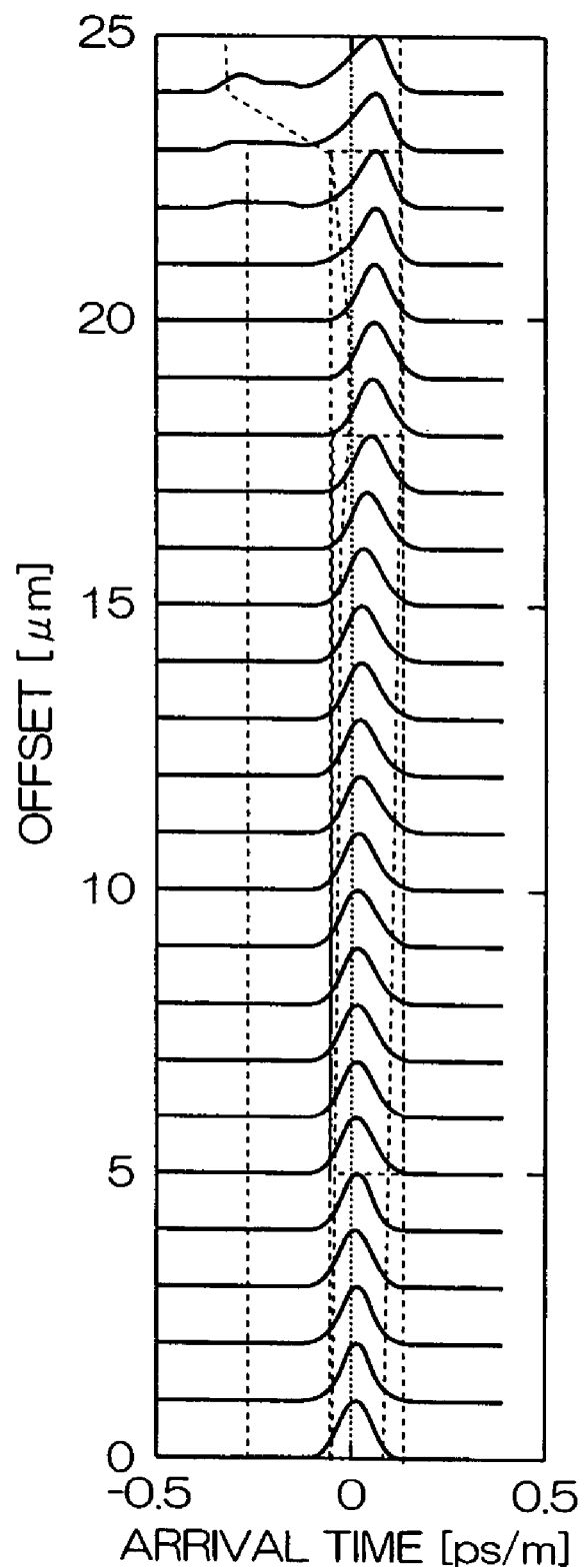
FIG. 14 is a graph illustrating the DMD characteristics of the GI multimode fiber of Comparative Example 4 at a wavelength of 0.87 µm.
Figure 15:
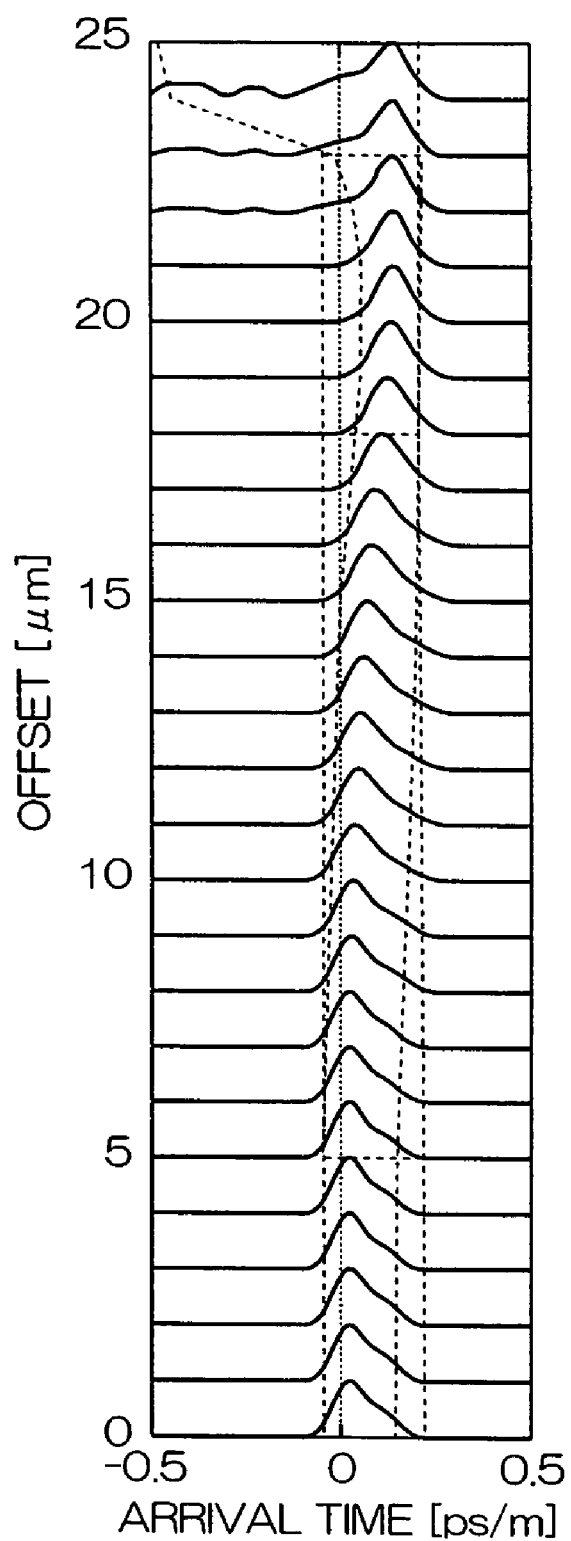
FIG. 15 is a graph illustrating the DMD characteristics of the GI multimode fiber of Comparative Example 4 at a wavelength of 0.89 µm.
Figure 16:
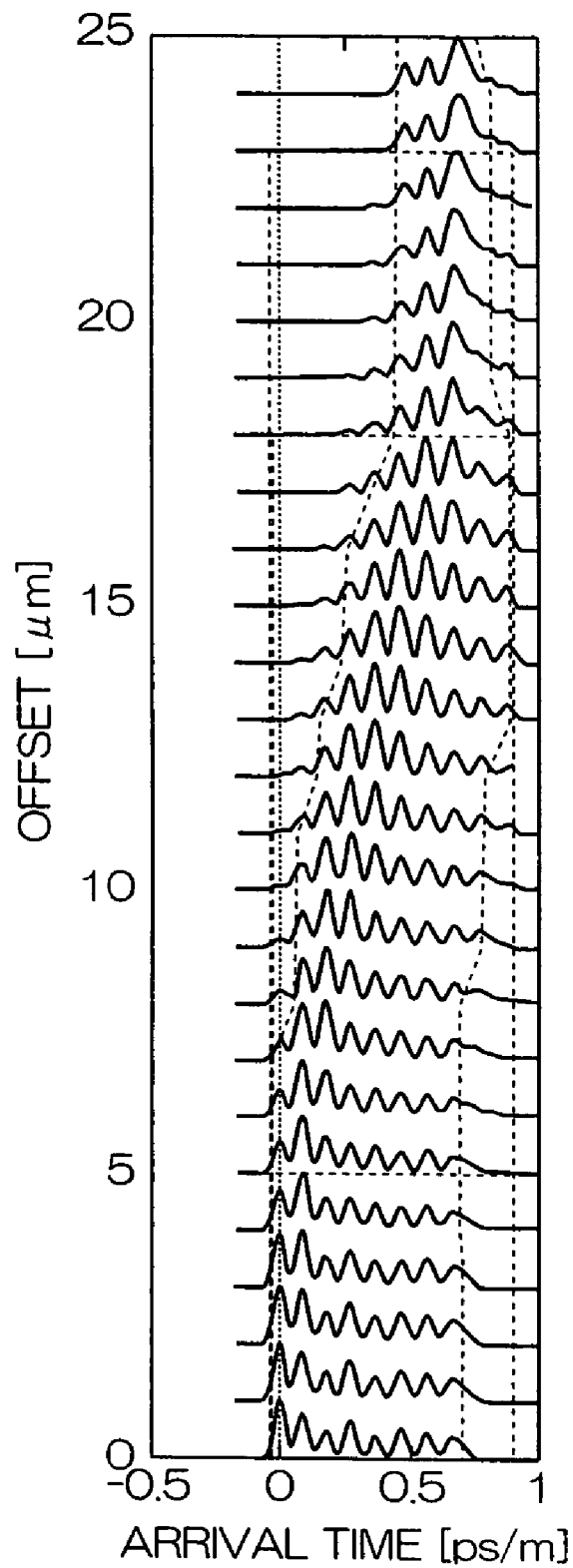
FIG. 16 is a graph illustrating the DMD characteristics of the GI multimode fiber of Comparative Example 4 at a wavelength of 1.30 µm.

The wavelength dependence of transmission bandwidth of the resultant GI multimode fibers 10 was examined. The results are shown in FIG. 4.

COMPARATIVE EXAMPLE 3

GI multimode fibers 10, including a core 12 made of silica glass doped with germanium of between 0 mole % and 13.2 mole % and a cladding 14 made of silica glass concentrically surrounding the core 12, were fabricated.

The relative refractive index difference Δ of the GI multimode fibers 10 with respect to the cladding 14 at the center of the core 16 was adjusted to 0.01, and the core radius "a" was set to 25 μm. Then the GI multimode fibers were optimized at a wavelength of 0.85 μm, and the refractive index profile exponential parameter α in Formula (1), which represents a refractive index profile of GI multimode fiber, was adjusted to 2.040.

The wavelength dependence of transmission bandwidth of the resultant GI multimode fibers was examined. The results are shown in FIG. 4.

The results shown in FIG. 4 confirmed that the GI multimode fibers of Example 3 provided a greater transmission bandwidth with an increase in wavelength. This is because the GI multimode fibers exhibit a small chromatic dispersion in a long wavelength region.

In contrast, the GI multimode fibers of Comparative Example 3 had a large transmission bandwidth only at a wavelength of 0.85 μm.

EXAMPLE 4

GI multimode fibers 10, including a core 12 made of silica glass doped with fluorine of between 0 atom % and 2.8 atom % and a cladding 14 made of silica glass doped with 2.8 atom % fluorine concentrically surrounding the core 12, were fabricated.

The relative refractive index difference Δ of the GI multimode fibers with respect to the cladding 14 at the center of the core 16 was adjusted to 0.01, and the core radius "a" was set to 25 μm. Then the GI multimode fibers 10 were optimized at a wavelength of 0.85 μm, and the refractive index profile exponential parameter α in Formula (1), which represents a refractive index profile of GI multimode fiber, was adjusted to 2.038.

The DMD (differential mode delay) characteristics of the GI multimode fibers 10 at wavelengths of 0.81, 0.83, 0.85, 0.87, 0.89, and 1.30 μm were calculated by simulation. In this simulation, propagation rates of various modes through the GI multimode fibers were simulated from the refractive index profiles using the technique discussed in K. Okamoto, "Comparison of calculated and measured impulse responses of optical fibers", Applied Optics, Vol. 18, pp. 2199–2206, 1979. Then, the excitation power in each mode was calculated using the technique described in L. Raddatz, I. H. White, D. G. Cunningham, and M. C. Nowell, "An experimental and theoretical study of the offset launch technique for the enhancement of the bandwidth of multimode fiber links", J. Lightwave Technol., Vol. 16, pp. 324–331, 1998 to obtain DMDs values. For the calculation, it was assumed that the pulse full width at half maximum (FWHM) of the incident light is 0.078 ns, the RMS (root mean square) spectrum is 0.068 nm, and the FWHM of the incident light beam size is 3.0 μm at wavelengths between 0.81 μm and 0.89 μm; and that the FWHM of the incident light is 0.05 ns, the RMS spectrum is 1.0 nm, and the FWHM of the incident light beam size is 3.0 μm at a wavelength of 1.30 μm. The resultant values are shown in FIGS. 5–10. FIGS. 5–10 illustrate the DMD characteristics at the wavelengths of 0.81, 0.83, 0.85, 0.87, 0.89 and 1.30 μm, respectively.

The DMD characteristics are waveforms of signal light at an output port calculated by simulation when the signal light is incident on an optical fiber with a certain offset from the center of the core 16.

As an offset of the incident signal light from the center of the core 16 becomes greater, the more signal light will be propagated in higher order modes. Therefore, the DMD characteristics correspond to a plot of light intensity of signal light propagated in each mode versus relative difference in arrival time. Waveforms having zero offset correspond to waveforms of signal light propagating at lower order modes whereas waveforms having greater offsets corresponds to those of signal light propagating at higher order modes.

COMPARATIVE EXAMPLE 4

GI multimode fibers 10, including a core 12 made of silica glass doped with germanium of between 0 mole % and 13.2 mole % and a cladding 14 made of silica glass concentrically surrounding the core 12, were fabricated.

The relative refractive index difference Δ of the GI multimode fibers 10 with respect to the cladding 14 at the center of the core 16 was adjusted to 0.01, and the core radius "a" was set to 25 μm. Then the GI multimode fibers were optimized at a wavelength of 0.85 μm, and the refractive index profile exponential parameter α in Formula (1), which represents a refractive index profile of GI multimode fibers, was adjusted to 2.040.

Similar to Example 4, the DMD (differential mode delay) characteristics of the GI multimode fibers at wavelengths of 0.81, 0.83, 0.85, 0.87, 0.89, and 1.30 μm were calculated by simulation. The resultant values are shown in FIGS. 11–16. FIGS. 11–16 illustrate the DMD characteristics at the wavelengths of 0.81, 0.83, 0.85, 0.87, 0.89 and 1.30 μm, respectively.

The results in FIGS. 5–10 indicate that the arrival times of signal light in all modes propagating through the GI multimode fibers of Example 4 are almost the same at wavelengths between 0.81 μm and 0.89 μm. Accordingly, it was confirmed that a large transmission bandwidth is obtained by the coarse wavelength division multiplexing (CWDM) technique at any wavelength in this wavelength range.

In contrast, the results in FIGS. 11–16 indicate that higher order modes increase at shorter wavelengths than 0.85 μm, whereas higher order modes decrease at longer wavelengths than 0.85 μm, thereby causing a remarkable increase in the pulse width in the GI multimode fibers of Comparative Example 4.

Although the pulse widths deviate in the GI multimode fibers of both Example 4 and Comparative of Example 4 at a wavelength of 1.30 μm, the GI multimode fiber of Example 4 has smaller DMD values.

As described above, since the GI multimode fiber according to the first embodiment of the present invention has a refractive index profile which satisfies Formula (1) due to fluorine doping, it is an optical fiber which has a large transmission bandwidth in a wide wavelength range, thus being suitable for wavelength division multiplexing (WDM). Furthermore, the GI multimode fiber according to the first embodiment of the present invention has a greater transmission bandwidth since fluorine, the dopant, generates a smaller chromatic dispersion than germanium, which is used in conventional GI multimode fibers.

(Second Embodiment)

A second exemplary embodiment of the present invention will be described in detail.

FIG. 37 is a schematic cross-sectional view showing an example of a GI multimode fiber 10 according to the second embodiment of the present invention. FIG. 38 shows an example of a refractive index distribution profile of the GI multimode fiber 10 according to the second embodiment of the present invention. It is not intended, however, that these figures show the actual dimension of the GI multimode fibers of the present invention, or the actual value of the refractive index thereof, or the actual shape of the profile curve thereof. The GI multimode fiber 10 according to the second embodiment of the present invention includes a core 12 made of silica glass containing fluorine (F) provided the center, and a cladding 14 which is provided concentrically surrounding the core 12. The graded-index multimode fiber 10 has a refractive index profile which satisfies the following Formula (1):

$$n(r) = \begin{cases} n_1\left[1 - 2\Delta\left(\frac{r}{a}\right)^\alpha\right]^{1/2} & (0 \leq r \leq a) \\ n_1(1 - 2\Delta)^{1/2} & (r > a) \end{cases} \quad (1)$$

where $n(r)$ is a refractive index of the optical fiber at a distance "r" from the center of the core 16, $n_1$ is a refractive index at the center of the core 16, Δ is a relative refractive index difference of the center of the core 16 with respect to the cladding 14, "a" is a core radius, and α is a refractive index profile exponential parameter. The core 12 contains a substance (i.e., dopant, hereinafter referred to as "Substance A"), which generally monotonically decreases the optimum value of the refractive index profile exponential parameter α in Formula (1) with an increase in wavelength and at least one substance (i.e., dopant, hereinafter referred to as "Substance B"), which generally monotonically increase the optimum value of the refractive index profile exponential parameter α with an increase in wavelength. The refractive index profile exponential parameter is optimized using the WKB method so that a transmission bandwidth at an operating wavelength region is maximized.

While the refractive index profile exponential parameter α is adjusted to a value which provides a maximum transmission bandwidth at a desired wavelength, the optimum value $\alpha_{opt}$ of a varies depending on a dopant doped into silica glass.

The refractive index profile of a GI multimode fiber 10 of the present invention, which is represented by Formula (1), is shaped such that once the refractive index profile is highest at the center of the core 16, it gradually decreases with an increase in distance from the center. Therefore, signal light propagating through the GI multimode fiber 10 in a lower order mode travels a shorter distance but at a slower rate. In contrast, signal light propagating in a higher order mode travels a longer distance but at a higher rate near the boundary between the core 12 and the cladding 14 where the refractive index is smaller.

Accordingly, by changing the value of α which determines the shape of the profile, the time lag until light signals at various modes propagating through the GI multimode fiber 10 reach the output port can be minimized. Under the properly selected α, the modal dispersion becomes the theoretical minimum, providing the maximum transmission bandwidth at the wavelength of signal light.

On the other hand, the optimum value $\alpha_{opt}$ of $\alpha$ changes depending on the wavelength employed. Furthermore, this change is affected by the one or more dopants doped into the core 12 and by the concentration of the one of more dopants. When a single dopant is used, the dopant can be classified into one of two types: Substance A or Substance B. The optimum value $\alpha_{opt}$ of a fiber doped with Substance A generally decreases with an increase in wavelength, whereas the $\alpha_{opt}$ of a fiber doped with Substance B increases with an increase in wavelength.

For Substance A, germanium (Ge), phosphorus pentaoxide ($P_2O_5$), or boron trioxide ($B_2O_3$) may be used, for example. Among them, germanium is preferable since it does not incur a significant loss, and is easy to control.

For Substance B, fluorine (F) may be used, for example.

The deviation of the optimum value $\alpha_{opt}$ of the GI multimode fiber 10 according to the second embodiment of the present invention is preferably, but not necessarily, 0.025 or less, and is more preferably, but not necessarily, 0.01 or less within a desired wavelength region.

If the deviation of the optimum value $\alpha_{opt}$ is greater than 0.025, the transmission bandwidth shifts significantly within the desired wavelength region with an increase in wavelength.

Furthermore, in the GI multimode fiber 10 according to the second embodiment of the present invention, the core radius "a" in Formula (1) is preferably, but not necessarily, no less than 10 µm and no more than 35 µm, and is more preferably, but not necessarily, no less than 20 µm and no more than 30 µm.

If the core radius "a" is less than 10 µm, it becomes difficult to couple fibers or to couple a fiber and a light source. In contrast, if a core radius "a" is greater than 35 µm, too many modes are generated, causing an increased modal dispersion and reducing the transmission bandwidth.

In the GI multimode fiber 10 according to the second embodiment of the present invention, the relative refractive index difference at the center of the core with respect to the cladding $\Delta$ is expressed by the equation: $\Delta=\Delta_1+\Delta_2$, where $\Delta_1$ is the relative refractive index difference of Substance A with respect to the cladding, and $\Delta_2$ is the relative refractive index difference of Substance B with respect to the cladding.

The relative refractive index difference $\Delta$ is determined by selecting the optimum values of $\Delta_1$ and $\Delta_2$ so that a desired refractive index profile is obtained and the optimum value $\alpha_{opt}$ satisfies the above equation. $\Delta_1/\Delta_2$ is preferably, but not necessarily, between 1/1 and 0/1, and is more preferably, but not necessarily, 1/4. If $\Delta_1/\Delta_2$ is less than 1/4, the optimum value $\alpha_{opt}$ monotonically increases with an increase in wavelength. In contrast, if $\Delta_1/\Delta_2$ is greater than 1/4, the optimum value $\alpha_{opt}$ monotonically decreases with an increase in wavelength.

Furthermore, Substances A and B are doped into the core 12 so that $\Delta_1$ and $\Delta_2$ satisfy the above equation. More specifically, the concentration of the dopant which increases the refractive index is monotonically reduced from the center of the core 16 toward the boundary between the core 12 and the cladding 14, and is zero at the boundary between the core 12 and the cladding 14. On the other hand, the concentration of the dopant which lowers the refractive index is zero at the center of the core 16, and is monotonically increased from the center of the core 16 toward the boundary between the core 12 and the cladding 14.

In the GI multimode fiber 10 according to the second embodiment of the present invention, the refractive index profile exponential parameter $\alpha$ in Formula (1), representing the refractive index profile of the fiber, is adjusted to an optimum value. The curve of the optimum value $\alpha_{opt}$ versus wavelength is generally flat, i.e., has almost no wavelength dependence and a quite low deviation in an overall wavelength range. Accordingly, even a GI multimode fiber, which is fabricated by optimizing $\alpha$ at a certain wavelength for obtaining the maximum transmission bandwidth, provides a large transmission bandwidth within almost the entire wavelength range.

For example, in a GI multimode fiber containing fluorine, $\alpha$ is optimized so that the maximum transmission bandwidth obtained at a short wavelength has a far wider transmission bandwidth in a long wavelength region compared to a conventional GI multimode fiber doped with germanium.

The GI multimode fiber 10 according to the second embodiment of the present invention has a relative refractive index difference at the center of the core with respect to the cladding $\Delta$ of 0.009 or greater, and the transmission bandwidth of 3 GHz·km or greater at wavelengths between 0.8 µm and 1.3 µm. A transmission bandwidth is defined as a product of a possible transmission rate and a length of an optical fiber, representing the transmission capacity of the optical fiber.

Therefore, the GI multimode fiber 10 according to the second embodiment of the present invention has a high transmission rate at wavelengths between 0.8 µm and 1.3 µm, enabling a wavelength division multiplexing (WDM) transmission.

The GI multimode fiber 10 according to the second embodiment of the present invention has a relative refractive index difference at the center of the core with respect to the cladding $\Delta$ of 0.019 or greater, and the transmission bandwidth of 2 GHz·km or greater at wavelengths between 0.8 µm and 1.4 µm.

Therefore, the GI multimode fiber 10 according to the second embodiment of the present invention has a high transmission rate at wavelengths between 0.8 µm and 1.4 µm, enabling a wavelength division multiplexing (WDM) transmission.

Fabrication of a GI multimode fiber 10 of the second embodiment of the present invention will now be described.

A preform of the GI multimode fiber 10 of the second embodiment of the present invention is fabricated using a PCVD (plasma chemical vapor deposition) or MCVD (modified plasma chemical vapor deposition) method by doping the two dopants simultaneously and by precisely controlling the amount of the dopants so that a desired refractive index profile is obtained. A GI multimode fiber 10 is formed by drawing the obtained preform under high temperature conditions.

The second embodiment of the present invention will now be described in greater detail using examples. It is not intended, however, that the present invention be limited to the examples described.

EXAMPLE 5

GI multimode fibers, including a core made of silica glass doped with germanium and a cladding made of silica glass concentrically surrounding the core and has $\Delta$ of 0.01 and the core radius "a" of 25 µm, were fabricated.

In addition, GI multimode fibers, including a core made of silica glass doped with fluorine and a cladding made of silica glass concentrically surrounding the core and has $\Delta$ of 0.01 and the core radius "a" of 25 µm, were fabricated.

For each of the GI multimode fibers, the wavelength dependence of the optimum value $\alpha_{opt}$ of the refractive index profile exponential parameter $\alpha$ in Formula (1), representing the refractive index profile of a GI multimode fiber, which is optimized using the WKB method so that the transmission bandwidth at an operating wavelength region is maximized, was characterized. The results are shown in FIG. 17.

Figure 17:
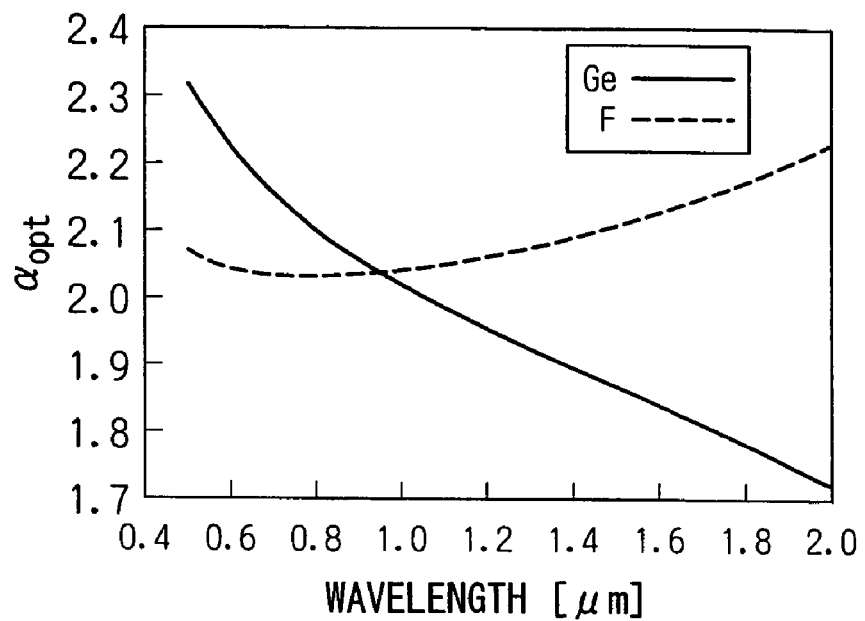
FIG. 17 is a graph illustrating the relationship between the transmission bandwidth of the GI multimode fiber of Example 5 and the optimum value $\alpha_{opt}$ of the refractive index profile exponential parameter $\alpha$ in Formula (1) representing the refractive index profile of a GI multimode fiber which is optimized using the WKB method so that the transmission bandwidth at an operating wavelength region is maximized.

The results shown in FIG. 17 confirmed that the optimum value $\alpha_{opt}$ of the GI multimode fiber, including a core containing germanium, monotonically decreases with an increase in wavelength. The results also confirmed that the optimum value $\alpha_{opt}$ of the refractive index profile exponential parameter $\alpha$ of the GI multimode fiber including a core containing fluorine is the smallest near the wavelength of 1.1 μm, and generally monotonically increases with an increase in wavelength.

These results indicate that a GI multimode fiber including a core containing germanium, which is optimized for a short wavelength region near 0.85 μM, does not have a large transmission bandwidth in a long wavelength region of 1.30 μm.

EXAMPLE 6

GI multimode fibers 10, including a core 12 made of silica glass doped with germanium and fluorine and a cladding 14 made of silica glass concentrically surrounding the core 12, were fabricated.

The relative refractive index difference $\Delta$ of the GI multimode fibers 10 with respect to the cladding 14 at the center of the core 16 was adjusted to 0.01, and the core radius "a" was set to 25 μm. $\Delta$ was set to be $\Delta_{Ge}+\Delta_F$ where $\Delta_{Ge}$ is the relative refractive index difference of germanium with respect to the cladding, and $\Delta_F$ is the relative refractive index difference of fluorine with respect to the cladding while varying the ratio of $\Delta_{Ge}$ to $\Delta_F$.

Transmission bandwidths and optimum values $\alpha_{opt}$ of the refractive index profile exponential parameter $\alpha$ in Formula (1), representing the refractive index profile of a GI multimode fibers, which is optimized using the WKB method so that the transmission bandwidth at an operating wavelength region is maximized, were determined to characterize the relationship between the transmission bandwidth and $\alpha_{opt}$. It is assumed that the pulse full width at half maximum (FWHM) of the incident light is 1 ns, the RMS (root mean square) spectrum is 0.5 nm, and the FWHM beam size of the incident light is 70 μm at wavelengths between 0.81 μm and 0.89 μm; and that the FWHM of the incident light is 1 ns, the RMS spectrum is 3 nm, and the FWHM beam size of the incident light is 70 μm at a wavelength of 1.30 μm. The results are shown in FIG. 18.

Figure 18:
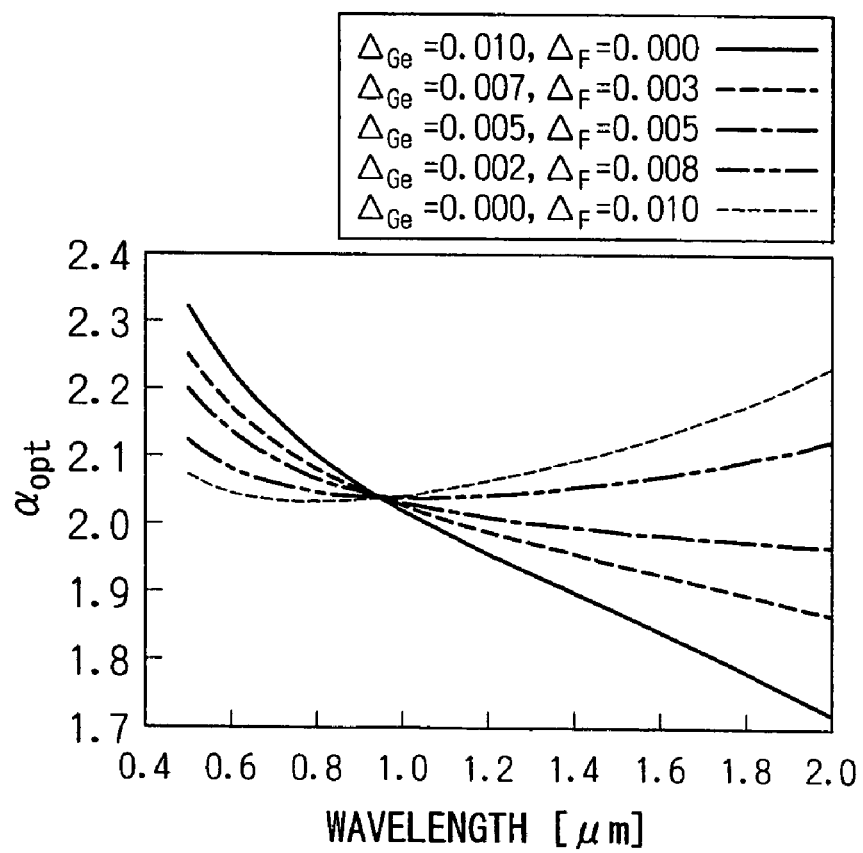
FIG. 18 is a graph illustrating the relationship between the transmission bandwidth of GI multimode fiber of Example 6 and the optimum value $\alpha_{opt}$ of the refractive index profile exponential parameter $\alpha$ in Formula (1) representing the refractive index profile of a GI multimode fiber which is optimized using the WKB method so that the transmission bandwidth at an operating wavelength region is maximized.

The results shown in FIG. 18 confirmed that by changing the ratio Of $\Delta_{Ge}$ to $\Delta_F$, i.e., the ratio of doped germanium to fluorine, the shape of the curve of the optimum value $\alpha_{opt}$ versus wavelength shifts, thus improving the wavelength characteristics of the GI multimode fibers. In particular, a flat curve of the optimum value $\alpha_{opt}$ is obtained with $\Delta_{Ge}$ of 0.002 and $\Delta_F$ of 0.008.

Relative refractive index differences of the core with respect to the cladding $\Delta$ of the GI multimode fiber 10 having $\Delta_{Ge}$ of 0.002 and $\Delta_F$ of 0.008 were determined at various radii. The results are shown in FIG. 19.

Figure 19:
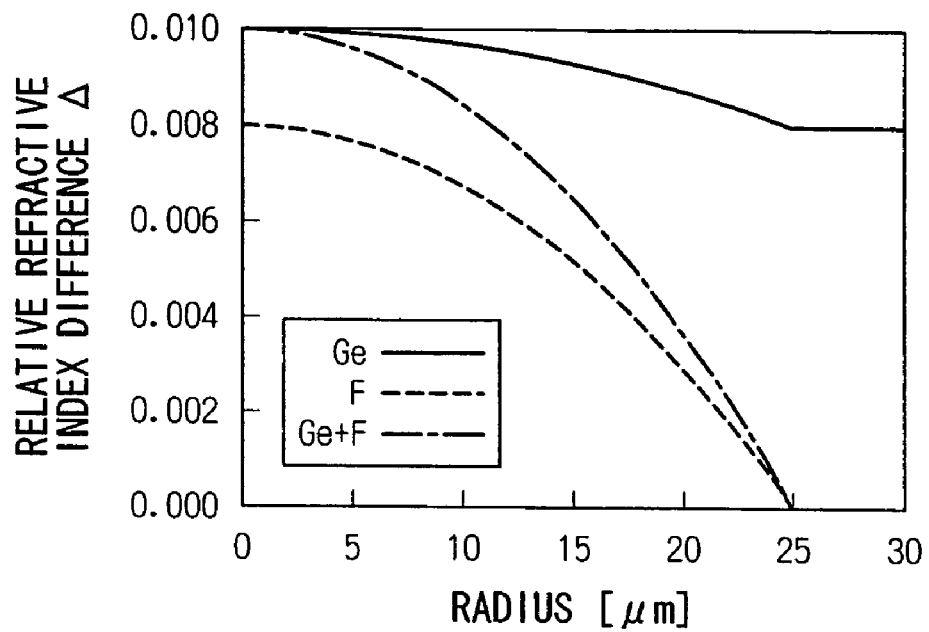
FIG. 19 is a graph illustrating the relative refractive index difference of the core with respect to the cladding $\Delta$ of the GI multimode fiber of Example 6.

The results shown in FIG. 19 confirmed that the relative refractive index difference $\Delta$ of this GI multimode fiber 10 is the maximum (0.01) at the center of the core 16, and becomes zero at the boundary between the core 12 and the cladding 14.

In addition, the concentration distribution of germanium $C_{Ge}(r)$ and the concentration distribution of fluorine $C_F(r)$ at the core, when $\Delta_{Ge}$ was 0.002 and $\Delta_F$ was 0.008, were determined. The results are shown in FIG. 20.

Figure 20:
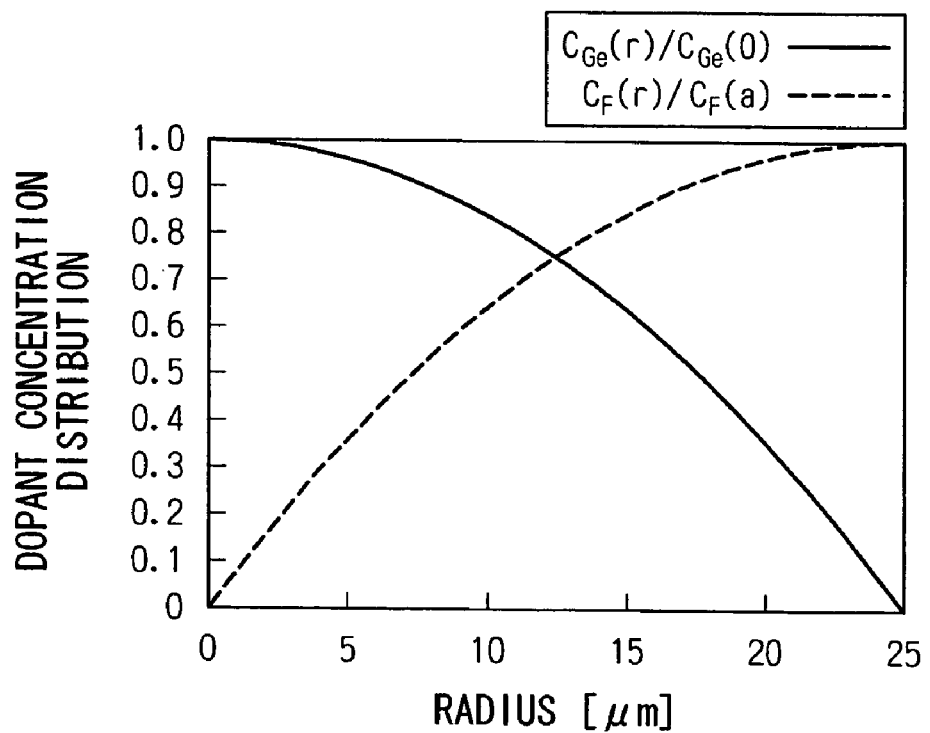
FIG. 20 is a graph illustrating the concentration distribution of germanium or fluorine at the core of the GI multimode fiber of Example 6.

The results shown in FIG. 20 confirmed that $C_{Ge}(r)$ monotonically decreases toward the boundary between the core 12 and the cladding 14 with an increase in distance from the center of the core 16, and becomes zero at the boundary between the core 12 and the cladding 14. In contrast, it is confirmed that $C_F(r)$ becomes zero at the center of the core 16, and monotonically increases toward the boundary between the core 12 and the cladding 14 with an increase in distance from the center of the core 16.

EXAMPLE 7

GI multimode fibers 10, including a core 12 made of silica glass doped with germanium and fluorine and a cladding 14 made of silica glass concentrically surrounding the core 12, were fabricated.

The relative refractive index difference $\Delta$ of the GI multimode fibers 10 with respect to the cladding 14 at the center of the core 16 was adjusted to 0.01, and the core radius "a" was set to 25 μm. $\Delta$ was set to be $\Delta_{Ge}+\Delta_F$ while varying the ratio of $\Delta_{Ge}$ to $\Delta_F$.

Then the GI multimode fibers 10 were optimized at a wavelength of 0.85 μm, and the optimum value $\alpha_{opt}$ of the refractive index profile exponential parameter $\alpha$ in Formula (1), representing the refractive index profile of a GI multimode fiber, which is optimized using the WKB method so that the transmission bandwidth at an operating wavelength region is maximized, was determined.

The wavelength dependence of transmission bandwidth of the resultant GI multimode fibers 10 was examined. The results are shown in FIG. 21.

Figure 21:
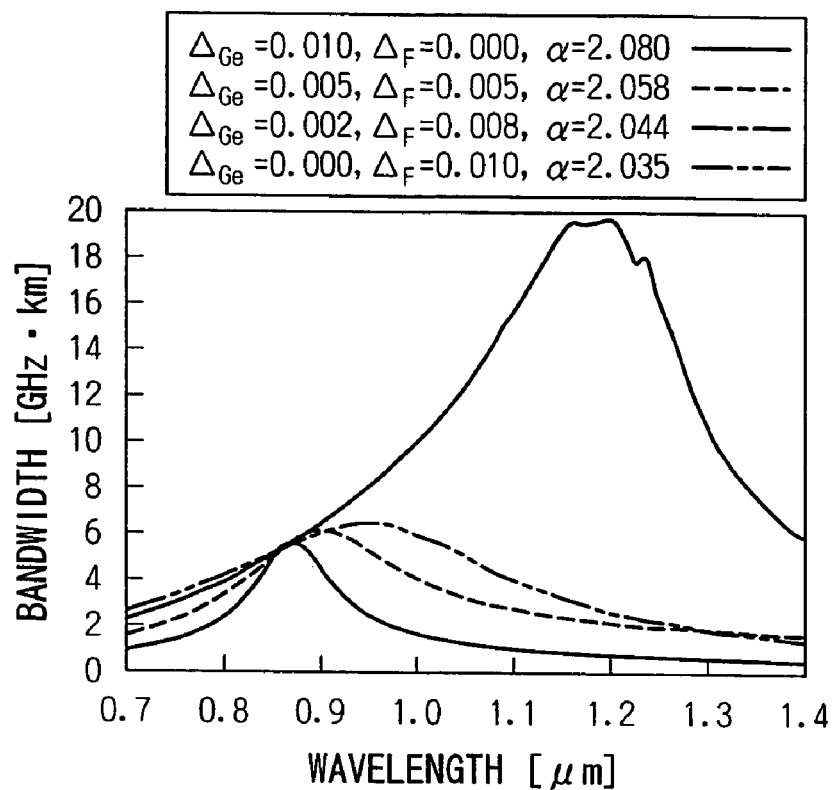
FIG. 21 is a graph illustrating the relationship between the transmission bandwidth and wavelength of GI multimode fibers of Example 7.

The results shown in FIG. 21 confirmed that a far larger transmission bandwidth was obtained in a wider wavelength range than the fiber doped with either germanium or fluorine into the core 12 when $\Delta_{Ge}$ was 0.002 and $\Delta_F$ was 0.008, and that the transmission bandwidth at wavelengths between 0.8 μm and 1.3 μm was greater than 3 GHz·km.

EXAMPLE 8

GI multimode fibers 10, including a core 12 made of silica glass doped with germanium and fluorine and a cladding 14 made of silica glass concentrically surrounding the core 12, were fabricated.

The relative refractive index difference $\Delta$ of the GI multimode fibers 10 with respect to the cladding 14 at the center of the core 16 was adjusted to 0.01, and the core radius "a" was set to 25 μm. $\Delta$ was set to be $\Delta_{Ge}+\Delta_F$ while varying the ratio of $\Delta_{Ge}$ to $\Delta_F$.

Then the GI multimode fibers 10 were optimized at a wavelength of 1.30 μm, and the optimum value $\alpha_{opt}$ of the refractive index profile exponential parameter $\alpha$ in Formula (1), representing the refractive index profile of a GI multimode fiber, which is optimized using the WKB method so that the transmission bandwidth at an operating wavelength region is maximized, was determined.

The wavelength dependence of transmission bandwidth of the resultant GI multimode fibers 10 was examined. The results are shown in FIG. 22.

Figure 22:
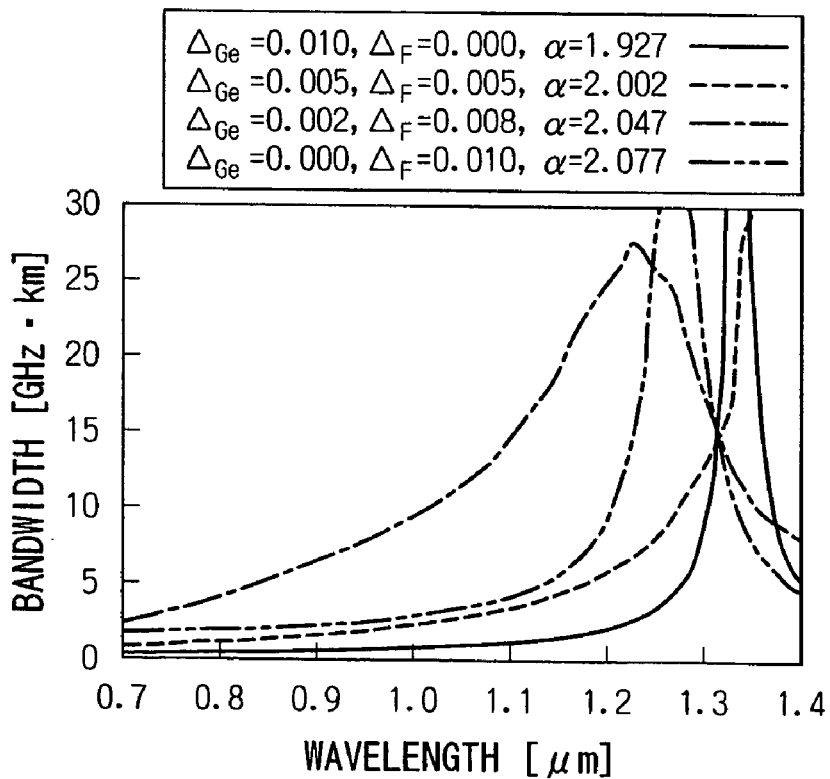
FIG. 22 is a graph illustrating the relationship between transmission bandwidth and wavelength of the GI multimode fibers of Example 8.

The results shown in FIG. 22 confirmed that a far larger transmission bandwidth was obtained in a wider wavelength range than the fiber doped with either germanium or fluorine into the core when $\Delta_{Ge}$ was 0.002 and $\Delta_F$ was 0.008, and that the transmission bandwidth at wavelengths between 0.8 µm and 1.3 µm was greater than 3 GHz·km.

EXAMPLE 9

GI multimode fibers 10, including a core 12 made of silica glass doped with germanium and fluorine and a cladding 14 made of silica glass concentrically surrounding the core 12, were fabricated.

The relative refractive index difference Δ of the GI multimode fibers 10 with respect to the cladding 14 at the center of the core 16 was adjusted to 0.02, and the core radius "a" was 32.5 µm. A was set to be $\Delta_{Ge}+\Delta_F$ while varying the ratio of $\Delta_{Ge}$ to $\Delta_F$.

Transmission bandwidths and optimum values $\alpha_{opt}$ of the refractive index profile exponential parameter α in Formula (1), representing the refractive index profile of a GI multimode fiber, which is optimized using the WKB method so that the transmission bandwidth at an operating wavelength region is maximized, were determined to characterize the relationship between the transmission bandwidth and $\alpha_{opt}$. It is assumed that the pulse full width at half maximum (FWHM) of the incident light is 1 ns, the RMS (root mean square) spectrum is 0.5 nm, and the FWHM beam size of the incident light is 70 µm at wavelengths between 0.81 µm and 0.89 µm; and that the FWHM of the incident light is 1 ns, the RMS spectrum is 3 µm, and the FWHM beam size of the incident light is 70 µm at a wavelength of 1.30 µm. The results are shown in FIG. 23.

Figure 23:
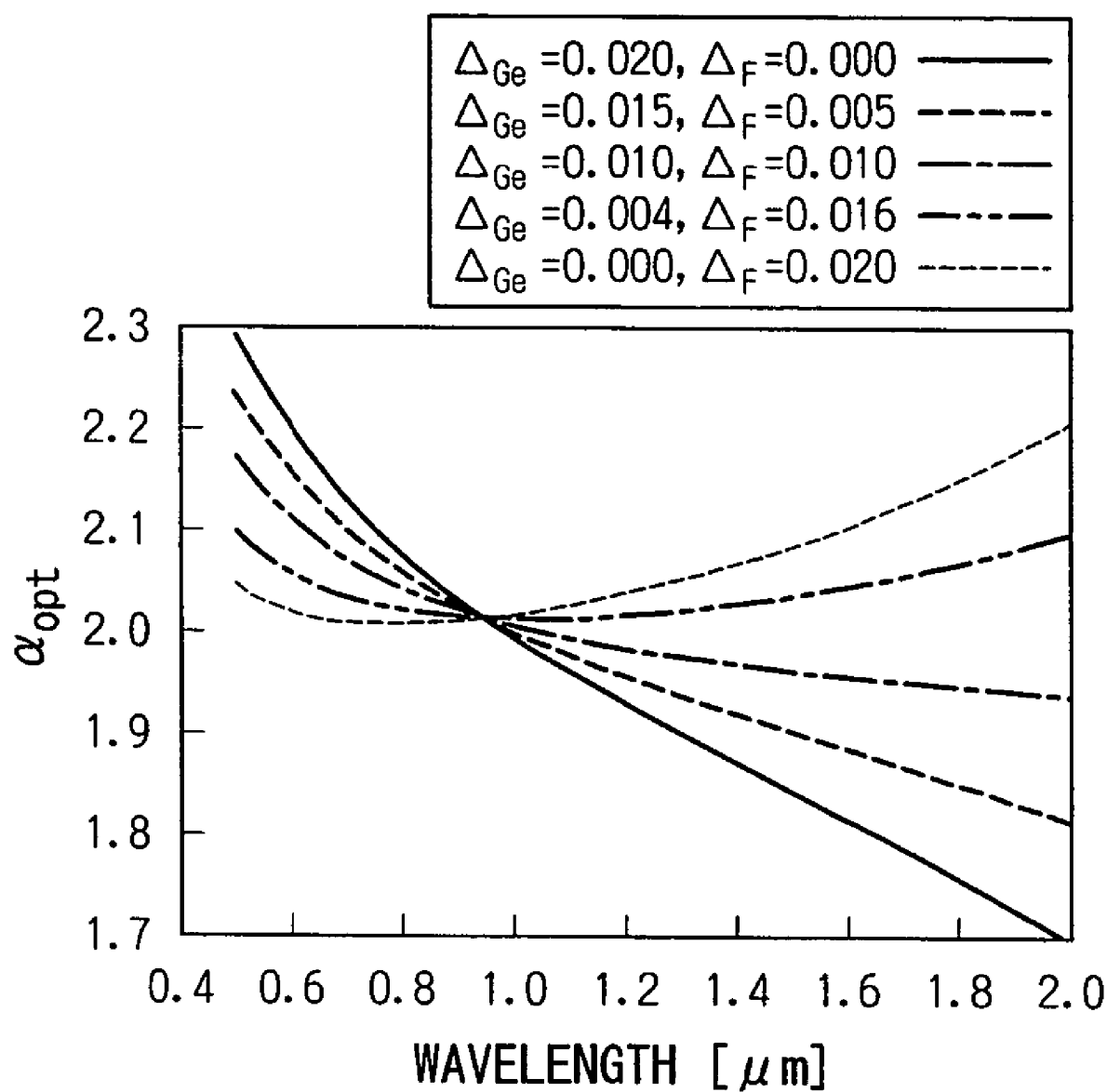
FIG. 23 is a graph illustrating the relationship between the transmission bandwidth of GI multimode fibers of Example 9 and the optimum value $\alpha_{opt}$ of the refractive index profile exponential parameter $\alpha$ in Formula (1) representing the refractive index profile of a GI multimode fiber which is optimized using the WKB method so that the transmission bandwidth at an operating wavelength region is maximized.

The results shown in FIG. 23 confirmed that by changing the ratio of $\Delta_{Ge}$ to $\Delta_F$, i.e., the ratio of doped germanium to fluorine, the shape of the curve of the optimum value $\alpha_{opt}$ versus wavelength shifts, thus improving the wavelength characteristics of the GI multimode fibers. In particular, a flat curve of the optimum value $\alpha_{opt}$ is obtained with $\Delta_{Ge}$ of 0.004 and $\Delta_F$ of 0.016.

EXAMPLE 10

GI multimode fibers 10, including a core made of silica 12 glass doped with germanium and fluorine and a cladding 14 made of silica glass concentrically surrounding the core 12, were fabricated.

The relative refractive index difference Δ of the GI multimode fibers 10 with respect to the cladding 14 at the center of the core 16 was adjusted to 0.02, and the core radius "a" was 32.5 µm. A was set to be $\Delta_{Ge}+\Delta_F$ while varying the ratio of $\Delta_{Ge}$ to $\Delta_F$.

Then the GI multimode fibers 10 were optimized at a wavelength of 0.85 µm, and the optimum value $\alpha_{opt}$ of the refractive index profile exponential parameter α in Formula (1), representing the refractive index profile of a GI multimode fiber, which is optimized using the WKB method so that the transmission bandwidth at an operating wavelength region is maximized, was determined.

The wavelength dependence of transmission bandwidth of the resultant GI multimode fibers 10 was examined. The results are shown in FIG. 24.

Figure 24:
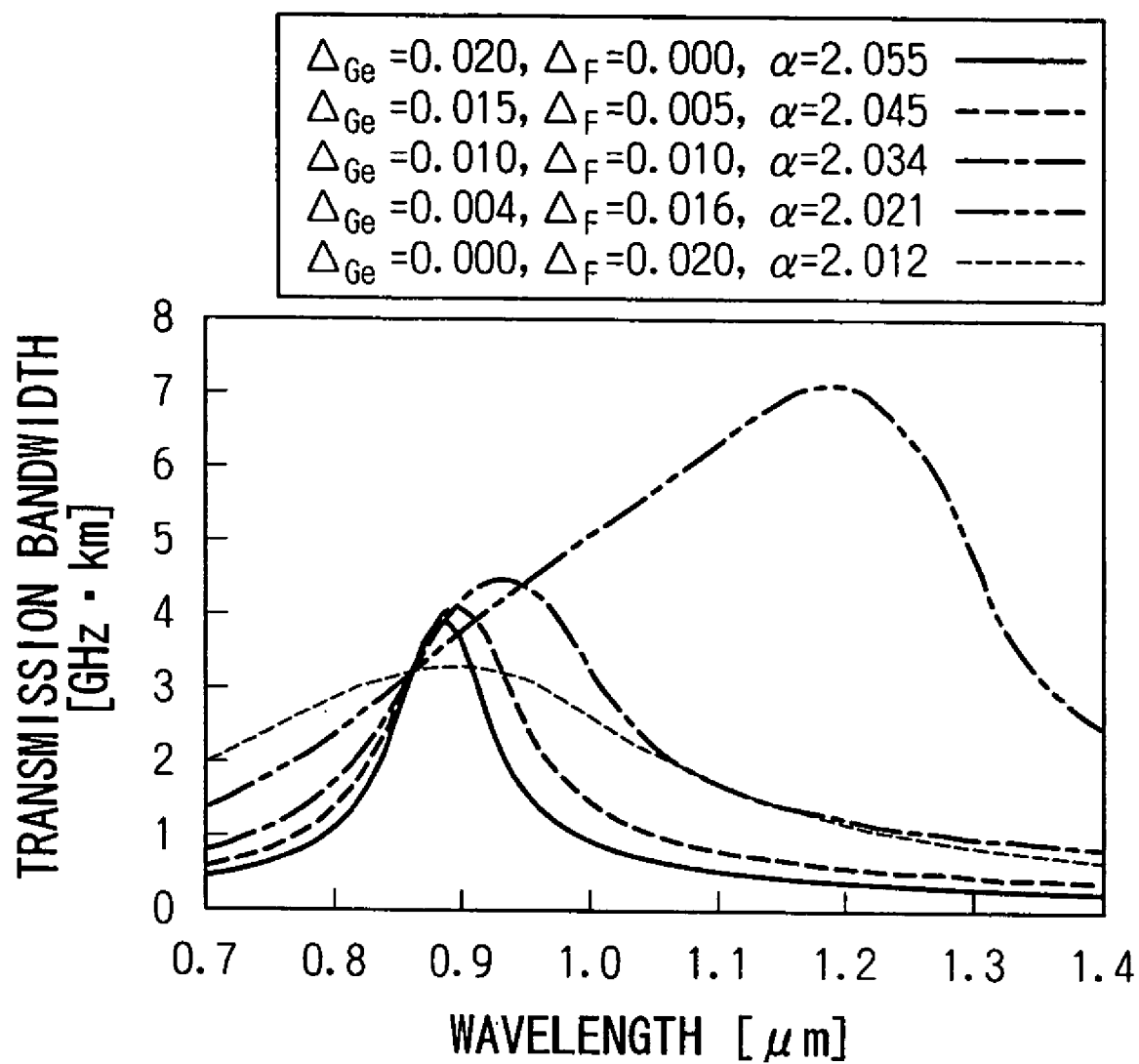
FIG. 24 is a graph illustrating the relationship between the transmission bandwidth and wavelength of GI multimode fibers of Example 10.

The results shown in FIG. 24 confirmed that a far larger transmission bandwidth was obtained in a wider wavelength range than the fiber doped with either germanium or fluorine into the core when $\Delta_{Ge}$ was 0.004 and $\Delta_F$ was 0.016, and that the transmission bandwidth at wavelengths between 0.8 µm and 1.4 µm was greater than 2 GHz·km.

EXAMPLE 11

GI multimode fibers 10, including a core 12 made of silica glass doped with germanium and fluorine and a cladding 14 made of silica glass concentrically surrounding the core 12, were fabricated.

The relative refractive index difference Δ of the GI multimode fibers 10 with respect to the cladding 14 at the center of the core 16 was adjusted to 0.02, and the core radius "a" was 32.5 µm. A was set to be $\Delta_{Ge}+\Delta_F$ while varying the ratio of $\Delta_{Ge}$ to $\Delta_F$.

Then the GI multimode fibers 10 were optimized at a wavelength of 1.30 µm, and the optimum value $\alpha_{opt}$ of the refractive index profile exponential parameter α in Formula (1), representing the refractive index profile of a GI multimode fiber, which is optimized using the WKB method so that the transmission bandwidth at an operating wavelength region is maximized, was determined.

The wavelength dependence of transmission bandwidth of the resultant GI multimode fibers 10 was examined. The results are shown in FIG. 25.

Figure 25:
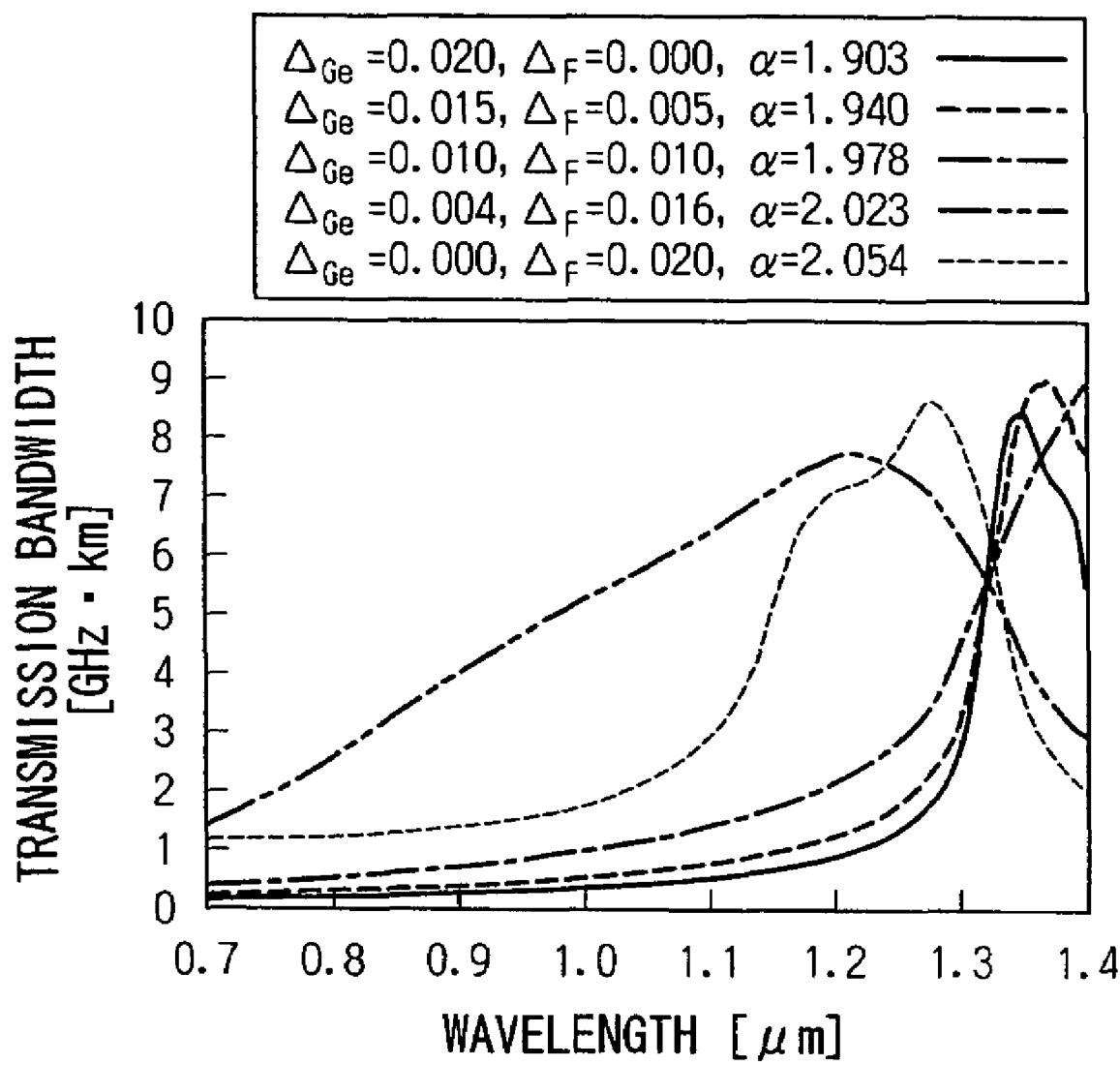
FIG. 25 is a graph illustrating the relationship between the transmission bandwidth and wavelength of GI multimode fibers of Example 11.

The results shown in FIG. 25 confirmed that a far larger transmission bandwidth was obtained in a wider wavelength range than the fiber doped with either germanium or fluorine into the core when $\Delta_{Ge}$ was 0.004 and $\Delta_F$ was 0.016, and that the transmission bandwidth at wavelengths between 0.8 µm and 1.4 µm was greater than 2 GHz·km.

As described above, the GI multimode fiber according to the second embodiment of the present invention contains a substance which monotonically decreases an optimum value of a refractive index profile exponential parameter α in Formula (1), which is optimized using the WKB method, so that a transmission bandwidth at an operating wavelength region is maximized, with an increase in wavelength generally, and at least one substance which generally monotonically increase the optimum value with an increase in wavelength. Thus, the GI multimode fiber is an optical fiber which has a large transmission bandwidth in a wide wavelength range, thus being suitable for wavelength division multiplexing (WDM).

(Third Embodiment)

A graded-index multimode fiber according to a third exemplary embodiment of the present invention will be described in detail.

FIG. 37 is a schematic cross-sectional view showing an example of a GI multimode fiber 10 according to the third embodiment of the present invention. FIG. 38 shows an example of a refractive index distribution profile of the GI multimode fiber 10 according to the third embodiment of the present invention. It is not intended, however, that these figures show the actual dimension of the GI multimode fibers of the present invention, or the actual value of the refractive index thereof, or the actual shape of the profile curve thereof. The GI multimode fiber 10 according to the third embodiment of the present invention is an optical fiber including a core 12, made of silica glass containing phosphorus (P) and fluorine (F), provided at the center, and a cladding 14 which is provided concentrically surrounding the core 12.

In addition, the GI multimode fiber 10 according to the third embodiment of the present invention is an optical fiber which has a refractive index profile which satisfies the following Formula (1):

$$n(r) = \begin{cases} n_1\left[1 - 2\Delta\left(\frac{r}{a}\right)^\alpha\right]^{1/2} & (0 \leq r \leq a) \\ n_1(1 - 2\Delta)^{1/2} & (r > a) \end{cases} \quad (1)$$

where n(r) is a refractive index of the optical fiber at a distance "r" from the center of the core 16, $n_1$ is a refractive index at the center of the core 16, $\Delta$ is a maximum relative refractive index difference of a core 14 with respect to the cladding 16, "a" is a core radius, and $\alpha$ is a refractive index profile exponential parameter. The core 12 contains phosphorus which generally monotonically decreases the optimum value of the refractive index profile exponential parameter with an increase in wavelength, and fluorine which generally monotonically increases the optimum value of the refractive index profile exponential parameter with an increase in wavelength.

The refractive index profile of a GI multimode fiber 10 of the present invention, which is represented by Formula (1), is shaped such that the refractive index profile is highest at the center of the core 16 and gradually decreases with an increase in distance from the center. Therefore, signal light propagating through the GI multimode fiber 10 in a lower order mode travels a shorter distance but at a slower rate. In contrast, signal light propagating in a higher order mode travels a longer distance but at a higher rate near the boundary between the core 12 and the cladding 14 where the refractive index is smaller.

Accordingly, by changing the value of $\alpha$ which determines the shape of the profile, the difference in arrival time until light signals at various modes propagating through the GI multimode fiber 10 reach the output port can be minimized. Under the properly selected $\alpha$, the modal dispersion becomes the theoretical minimum, providing the maximum transmission bandwidth at the wavelength of signal light.

On the other hand, the optimum value $\alpha_{opt}$ of $\alpha$ changes depending on the wavelength employed. Furthermore, this change is affected by the one or more dopants doped into the core 12 and by the concentration of the one of more dopants. When a single dopant is used, the dopant can be classified into one of two types: Substance A or Substance B. The optimum value $\alpha_{opt}$ of a fiber doped with Substance A generally decreases with an increase in wavelength, whereas the $\alpha_{opt}$ of a fiber doped with Substance B increases with an increase in wavelength.

Figure 26:
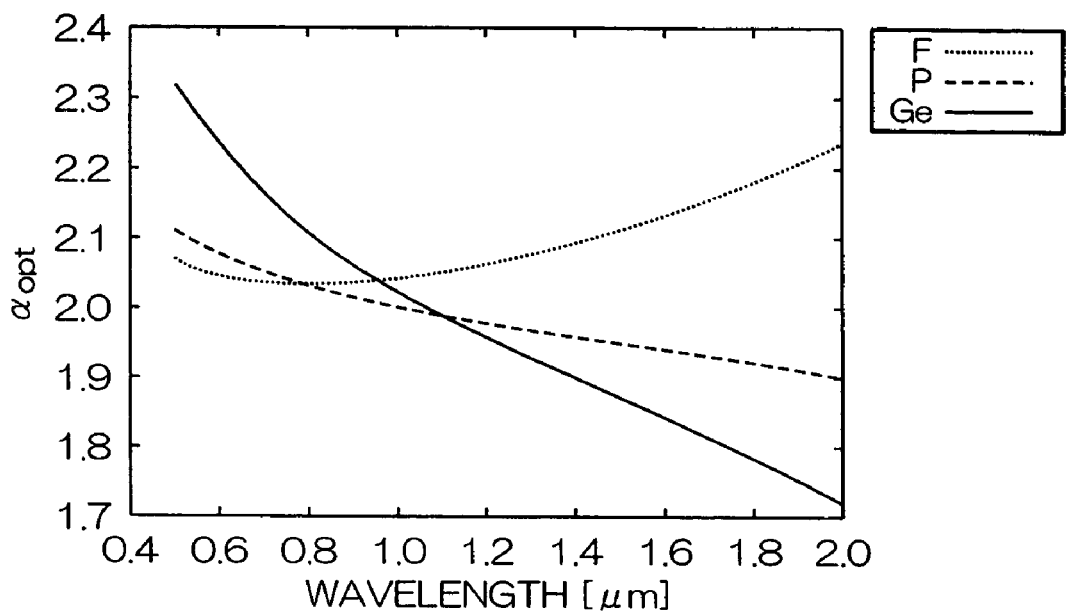
FIG. 26 is a graph illustrating the wavelength dependence of the optimum values $\alpha_{opt}$ of the refractive index profile exponential parameters a in Formula (1) which represents the refractive index profile of three GI multimode fibers each have a core doped with germanium or phosphorus or fluorine, respectively.

FIG. 26 is a graph illustrating the wavelength dependence of the optimum values $\alpha_{opt}$ of the refractive index profile exponential parameters $\alpha$ in Formula (1), which represents the refractive index profile of three GI multimode fibers, each having a core doped with germanium or phosphorus or fluorine, respectively.

In the computations of values in FIG. 26 and in other calculations mentioned below, the index, described in N. Shibata and T. Edahiro, "Refractive-index dispersion for GeO$_2$-, P$_2$O$_5$- and B$_2$O$_3$-doped silica glasses in optical fibers", Trans. IECE Japan, Vol. E65, pp. 166–172, 1982, was used as the material dispersion index of pure silica and germanium-doped silica, and the index, described in J. W. Fleming, "Material dispersion in lightguide glasses", Electron Lett., Vol. 14, pp. 326–328, 1978, was used as the material dispersion index of fluorine-doped silica.

FIG. 26 shows that after the optimum value $\alpha_{opt}$ reaches the maximum near a wavelength of 0.7 μm, it generally monotonically increases with an increase in wavelength in the GI multimode fiber including a core containing fluorine. The optimum value $\alpha_{opt}$ however, monotonically decreases with an increase in wavelength in the GI multimode fibers containing germanium or phosphorus in the core thereof.

In addition, FIG. 26 illustrates that if these GI multimode fibers 10 are optimized at a certain wavelength, for example, a wavelength of 0.85 μm, the values of the refractive index profile exponential parameter $\alpha$ departs from the optimum values $\alpha_{opt}$ in other wavelengths than 0.85 μm. As a result, a large transmission bandwidth cannot be obtained.

Furthermore, FIG. 26 indicates that the optimum value $\alpha_{opt}$ deviates the most when changing wavelength in the GI multimode fiber 10, including a core 12 containing germanium, exhibiting the largest wavelength dependence of transmission bandwidth.

In contrast, the change with wavelength of the optimum value $\alpha_{opt}$ is small in the GI multimode fibers 10 having a core 12 containing phosphorus or fluorine. Therefore, the wavelength dependence of transmission bandwidth is smaller in these GI multimode fibers.

Thus, a wavelength dependence of transmission bandwidth of a GI multimode can be reduced by doping phosphorus and fluorine into the core, and a large transmission bandwidth range can be obtained in a wide wavelength range.

Furthermore, by doping phosphorus into silica glass, the viscosity of silica glass at high temperatures can be reduced. In the GI multimode fiber 10 according to the third embodiment of the present invention, since a large amount of phosphorus is doped into the center of the core 16, the viscosity of the center of the core 16 is reduced. Therefore, the collapsing process during the fabrication of a fiber preform can be easily performed using a PCVD (Plasma Chemical Vapor Deposition Method) or MCVD (Modified Chemical Vapor Deposition Method) method to form a fiber preform.

Furthermore, a lower fiber preform viscosity of the center of the core 16 in the fabrication of the fiber preform can reduce dips at the core center (central dips). This enables the easy control of the refractive index profile of fibers.

Such central dips, generated due to migration of dopant during the collapsing process, adversely affect performance of fibers.

Furthermore, since a fiber including a core doped with phosphorus has a small Rayleigh scattering index, a fiber having a small loss in a short wavelength range can be obtained.

In addition, in the graded-index multimode fiber 10 according to the third embodiment of the present invention, the maximum relative refractive index difference $\Delta$ of the core with respect to the cladding is expressed by the following Formula (2):

$$\Delta = \Delta_P + \Delta_F \quad (2)$$

where $\Delta_P$ is the relative refractive index difference of phosphorus with respect to the cladding, and $\Delta_F$ is the relative refractive index difference of fluorine with respect to the cladding.

Preferably, but not necessarily, in the GI multimode fiber 10 according to the third embodiment of the present invention, the maximum relative refractive index difference $\Delta$ in Formula (2) is no less than 0.005 and no more than 0.025; the relative refractive index difference $\Delta_P$ is no less than 0 and no more than $\Delta$; and the relative refractive index difference $\Delta_F$ is no less than 0 and no more than $\Delta$.

If the maximum relative refractive index difference Δ is less than 0.005, the NA (numerical aperture) of the fiber becomes smaller, making coupling between the fiber and a light source difficult. If the maximum relative refractive index difference Δ is greater than 0.025, too many modes are generated and the transmission bandwidth is reduced.

In the GI multimode fiber 10 according to the third embodiment of the present invention, the maximum relative refractive index difference Δ in Formula (2) is preferably, but not necessarily, no less than 0.005 and no more than 0.025. The core radius "a" in Formula (1) is preferably, but not necessarily, no less than 10 μm and no more than 35 μm, and is more preferably, but not necessarily, no less than 20 μm and no more than 30 μm.

If the core radius "a" is less than 10 μm, it becomes difficult to couple fibers or to couple a fiber and a light source. In contrast, a core radius "a" of greater than 35 μm generates too many modes, causing an increased modal dispersion, and reduces transmission bandwidth.

The GI multimode fiber 10 according to the third embodiment of the present invention has a maximum relative refractive index difference of Δ of 0.009 or greater, a numerical aperture of 0.185 or greater, and a transmission bandwidth of 2 GHz·km or greater at wavelengths between 0.8 μm and 1.4 μm.

A transmission bandwidth is defined as a product of a possible transmission rate and a length of an optical fiber, representing the transmission capacity of the optical fiber.

Furthermore, the GI multimode fiber 10 according to the third embodiment of the present invention has the maximum relative refractive index difference Δ of 0.019 or greater, the numerical aperture of 0.26 or greater, and a transmission bandwidth of 1.5 GHz·km or greater at wavelengths between 0.8 μm and 1.4 μm.

Therefore, the GI multimode fiber 10 according to the third embodiment of the present invention has a high transmission rate in a wavelength range between 0.8 μm and 1.4 μm, enabling a wavelength division multiplexing (WDM) transmission.

Fabrication of a GI multimode fiber 10 of the third embodiment of the present invention will now be described.

A preform of the GI multimode fiber 10 of the third embodiment of the present invention is fabricated using a PCVD (plasma chemical vapor deposition) or MCVD (modified plasma chemical vapor deposition) method by doping the two dopants simultaneously and by precisely controlling the amount of the dopants so that a desired refractive index profile is obtained. A GI multimode fiber 10 is formed by drawing the obtained fiber preform under high temperature conditions.

The third embodiment of the present invention will now be described in greater detail using examples. It is not intended, however, that the present invention be limited to the examples described.

EXAMPLE 12

GI multimode fibers 10, including a core 12 made of silica glass doped with phosphorus and fluorine and a cladding 14 made of silica glass concentrically surrounding the core 12, were fabricated. The relative refractive index difference Δ of the GI multimode fibers 10 with respect to the cladding at the center of the core 16 was adjusted to 0.01, and the core radius "a" was set to 25 μm. Δ was set to be $\Delta_P+\Delta_F$ while varying the ratio of $\Delta_P$ to $\Delta_F$, where $\Delta_P$ is the relative refractive index difference of phosphorus with respect to the cladding, and $\Delta_F$ is the relative refractive index difference of fluorine with respect to the cladding.

The wavelength dependence of the optimum value $\alpha_{opt}$ of the refractive index profile exponential parameter α was determined when fixing $\Delta=\Delta_P+\Delta_F=0.01$ as a constant and varying the ratio of $\Delta_P$ to $\Delta_F$. The results are shown in FIG. 27.

Figure 27:
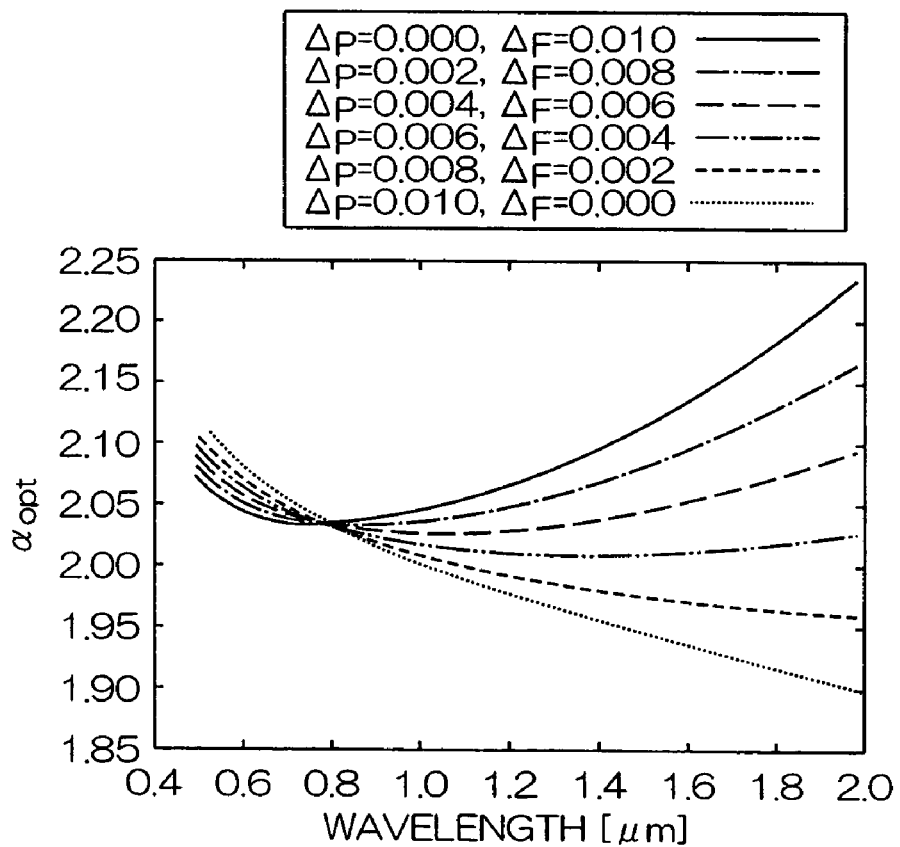
FIG. 27 is a graph illustrating the wavelength dependence of the optimum values $\alpha_{opt}$ of the refractive index profile exponential parameters a in Formula (1) which represents the refractive index profile in GI multimode fibers of Example 12 each doped with phosphorus and fluorine.

The results shown in FIG. 27 confirmed that by changing the ratio of $\Delta_P$ to $\Delta_F$, i.e., the ratio of doped phosphorus to fluorine, the shape of the curve of the optimum value $\alpha_{opt}$ versus wavelength shifts, thus improving the wavelength characteristics of the GI multimode fiber. In particular, a flat curve of the optimum value $\alpha_{opt}$ is obtained with $\Delta_P$ of 0.004 and $\Delta_F$ of 0.006.

These results confirmed that wavelength characteristics of a GI multimode fiber can be improved by doping germanium and fluorine into the core. In addition, a large transmission bandwidth can be obtained in a GI multimode fiber in a very wide wavelength range by optimizing the ratio of germanium to fluorine.

EXAMPLE 13

GI multimode fibers 10, including a core 12 made of silica glass doped with phosphorus and fluorine and a cladding 14 made of silica glass concentrically surrounding the core 12, were fabricated.

The GI multimode fibers 10 were optimized at a wavelength of 0.85 μm, the relative refractive index difference Δ of the fiber with respect to the cladding 14 at the center of the core 16 was adjusted to 0.01, and the core radius "a" was set to 25 μm.

$\Delta=\Delta_P+\Delta_F=0.01$ was fixed as a constant and the ratio of $\Delta_P$ to $\Delta_F$ was varied.

The wavelength dependence of OFL (over-filled launch) transmission bandwidth of the resultant GI multimode fibers 10 was determined. The results are shown in FIG. 28.

Figure 28:
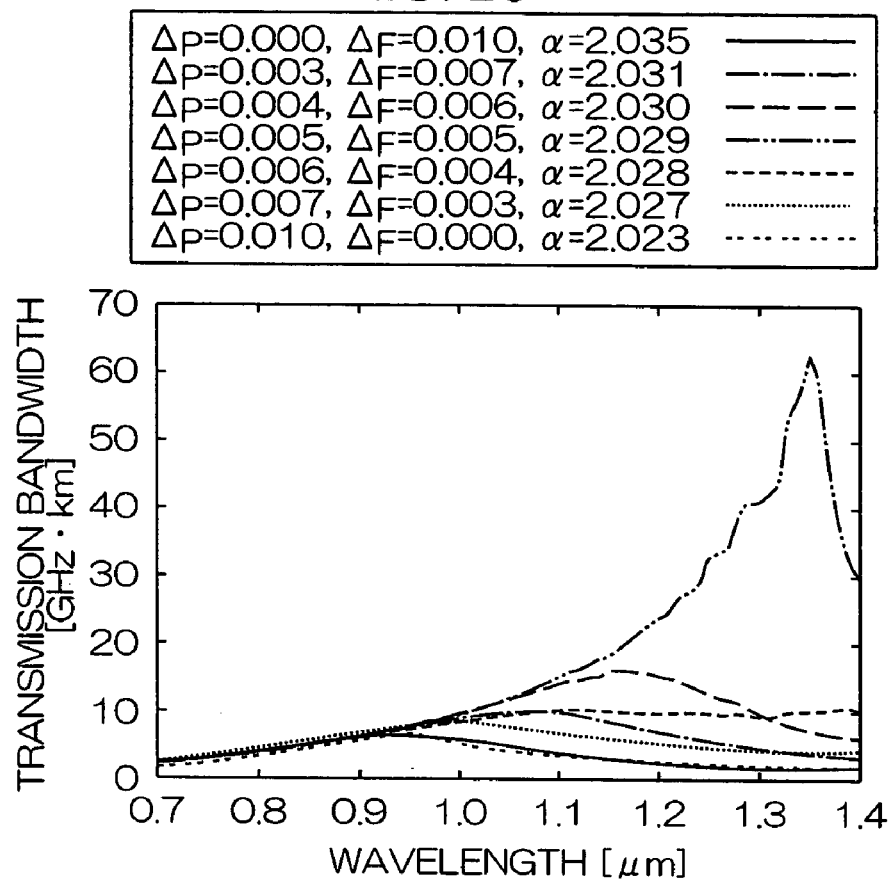
FIG. 28 is a graph illustrating the wavelength dependence of transmission bandwidth of GI multimode fibers of Example 13 having a core doped with phosphorus and fluorine.

The results shown in FIG. 28 confirmed that the GI multimode fibers including a core doped with phosphorus and fluorine have a large transmission bandwidth in a wider wavelength range than the GI multimode fibers including a core doped with either phosphorus or fluorine. Furthermore, it was confirmed that the fiber having $\Delta_P$ of 0.005 and $\Delta_F$ of 0.005 exhibits the best performance.

Figure 29:
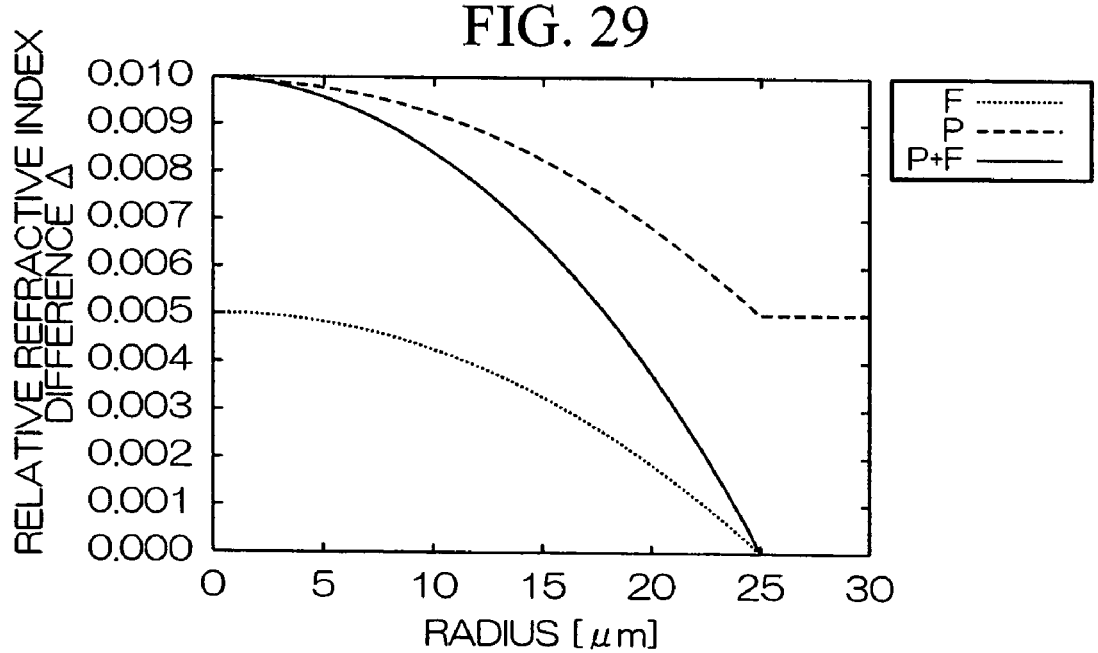
FIG. 29 is a graph illustrating the relative refractive index difference distribution of the GI multimode fibers of Example 13 having $\Delta_P$ of 0.005 and $\Delta_F$ of 0.005.

FIG. 29 is a graph illustrating the relative refractive index difference distribution of the fibers having $\Delta_P$ of 0.005 and $\Delta_F$ of 0.005.

EXAMPLE 14

GI multimode fibers 10, including a core 12 made of silica glass doped with phosphorus and fluorine and a cladding 14 made of silica glass concentrically surrounding the core 12, were fabricated.

The GI multimode fibers 10 were optimized at a wavelength of 1.30 am, and the relative refractive index difference Δ of the fiber with respect to the cladding 14 at the center of the core 16 was adjusted to 0.01, and the core radius "a" was set to 25 μM.

$\Delta=\Delta_P+\Delta_F=0.01$ was fixed as a constant and the ratio of $\Delta_P$ to $\Delta_F$ was varied.

The wavelength dependence of OFL transmission bandwidth of the resultant GI multimode fibers 10 was examined. The results are shown in FIG. 30.

Figure 30:
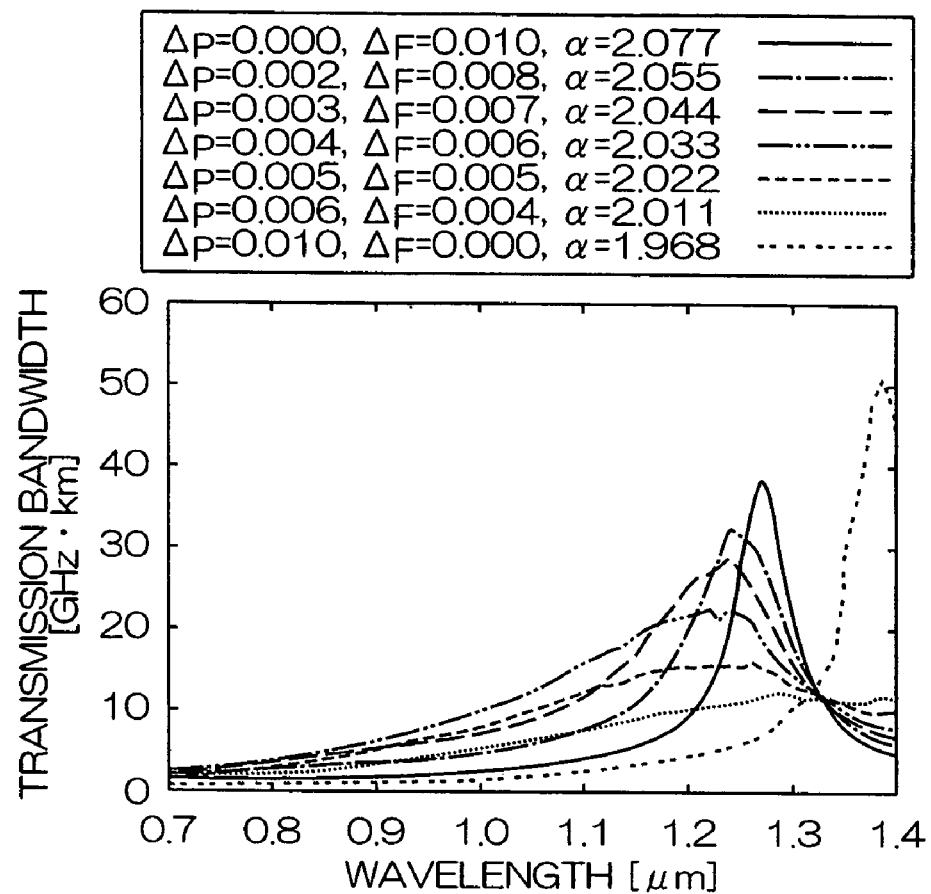
FIG. 30 is a graph illustrating the wavelength dependence of transmission bandwidth of GI multimode fibers of Example 14 having a core doped with phosphorus and fluorine.

The results shown in FIG. 30 confirmed that the GI multimode fibers, including a core doped with phosphorus and fluorine, have a large transmission bandwidth in a wider wavelength range than the GI multimode fibers including a core doped with either phosphorus or fluorine. Furthermore, it was confirmed that the fiber having $\Delta_P$ of 0.004 and $\Delta_F$ of 0.006 exhibits the best performance.

Figure 31:
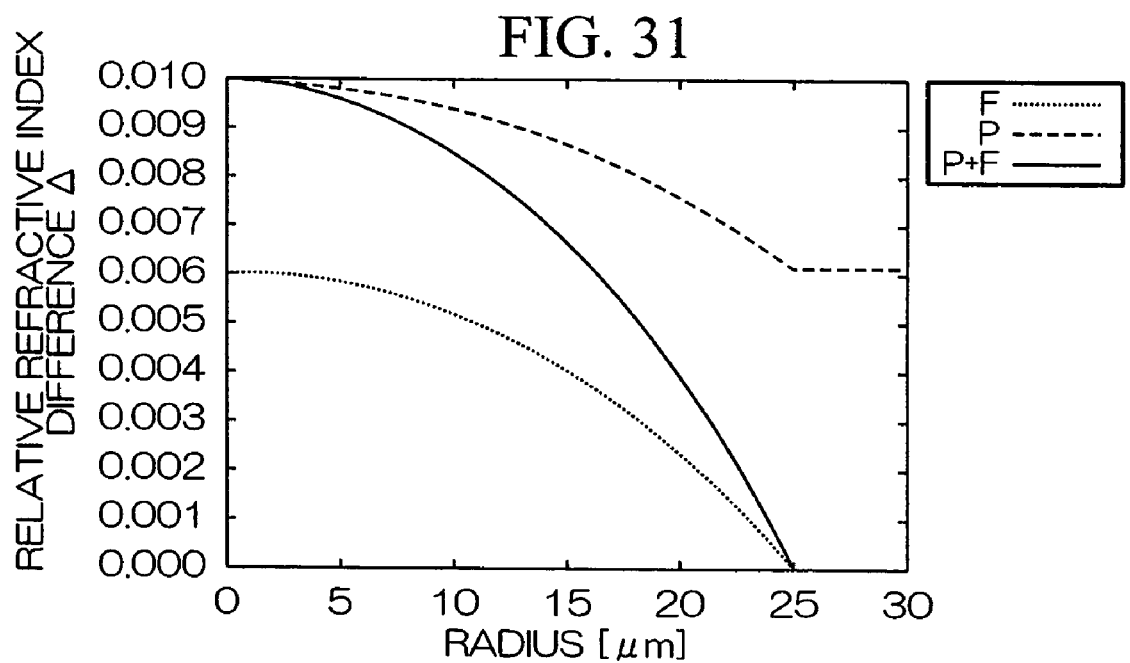
FIG. 31 is a graph illustrating the relative refractive index difference distribution of the GI multimode fibers of Example 14 having $\Delta_P$ of 0.004 and $\Delta_F$ of 0.006.

FIG. 31 is a graph illustrating the relative refractive index difference distribution of the fiber having $\Delta_P$ of 0.004 and $\Delta_F$ of 0.006.

EXAMPLE 15

GI multimode fibers 10, including a core 12 made of silica glass doped with phosphorus and fluorine and a cladding 14 made of silica glass concentrically surrounding the core 12, were fabricated.

The relative refractive index difference $\Delta$ of the GI multimode fibers 10 with respect to the cladding 14 at the center of the core 16 was adjusted to 0.02, and the core radius "a" was set to 31.25 μm. $\Delta$ was set to be $\Delta_P+\Delta_F$ while varying the ratio of $\Delta_P$ to $\Delta_F$.

The wavelength dependence of the optimum value $\alpha_{opt}$ of the refractive index profile exponential parameter $\alpha$ was determined when fixing $\Delta=\Delta_P+\Delta_F=0.02$ as a constant and varying the ratio of $\Delta_P$ to $\Delta_F$. The results are shown in FIG. 32.

Figure 32:
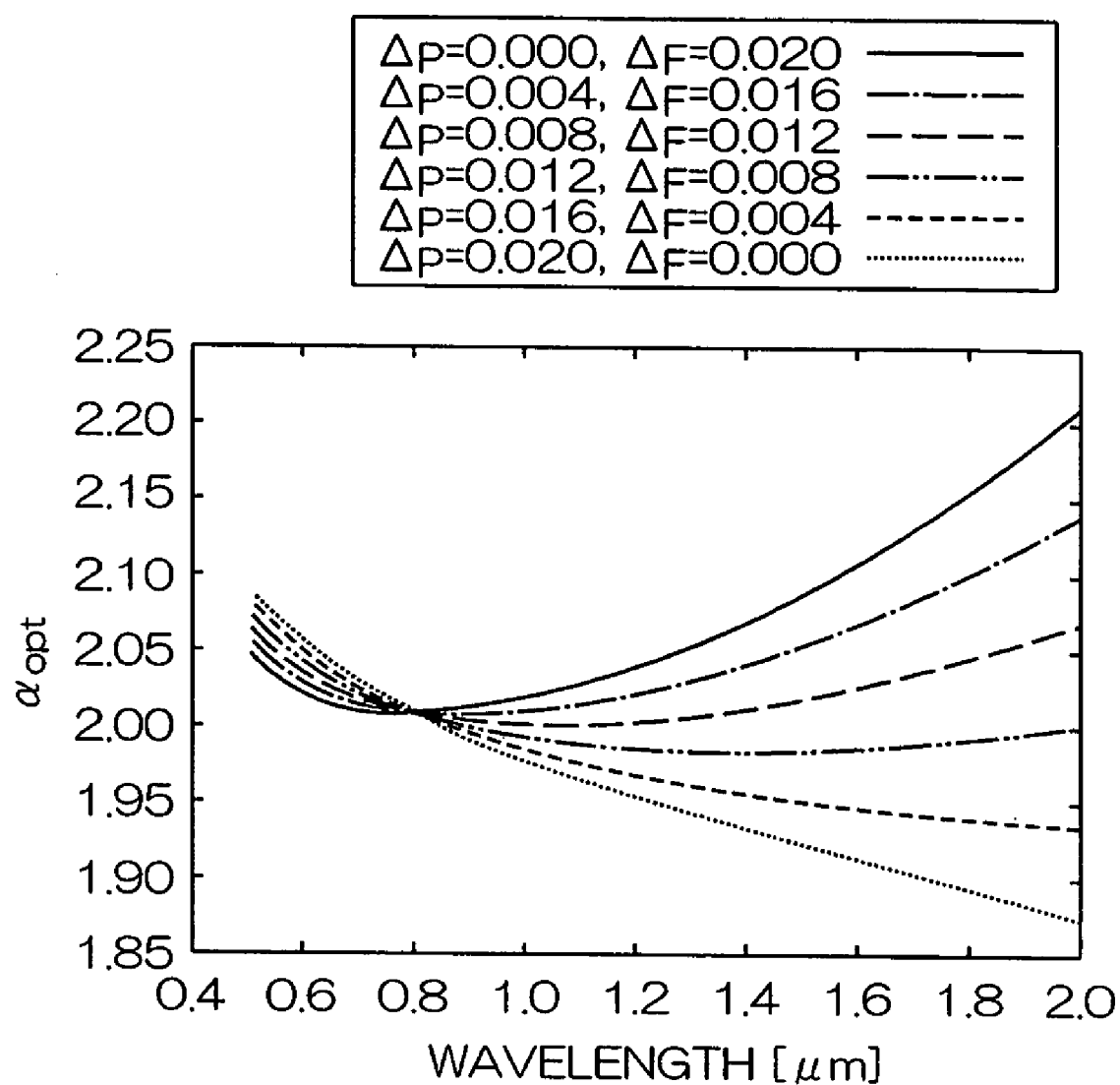
FIG. 32 is a graph illustrating the wavelength dependence of the optimum values $\alpha_{opt}$ of the refractive index profile exponential parameters a in Formula (1) which represents the refractive index profile in GI multimode fibers of Example 15 having a core doped with phosphorus and fluorine.

The results shown in FIG. 32 confirmed that by changing the ratio of $\Delta_P$ to $\Delta_F$, i.e., the ratio of doped phosphorus to fluorine, the shape of the curve of the optimum value $\alpha_{opt}$ versus wavelength shifts, thus improving the wavelength characteristics of the GI multimode fibers. In particular, a flat curve of the optimum value $\alpha_{opt}$ is obtained with $\Delta_P$ of 0.008 and $\Delta_F$ of 0.012.

EXAMPLE 16

GI multimode fibers 10, including a core 12 made of silica glass doped with phosphorus and fluorine and a cladding 14 made of silica glass concentrically surrounding the core 12, were fabricated.

The GI multimode fibers 10 were optimized at a wavelength of 0.85 μm, the relative refractive index difference $\Delta$ of the fiber with respect to the cladding 14 at the center of the core 16 was adjusted to 0.02, and the core radius "a" was set to 31.25 μm.

$\Delta=\Delta_P+\Delta_F=0.02$ was fixed as a constant, and the ratio of $\Delta_P$ to $\Delta_F$ was varied.

The wavelength dependence of OFL transmission bandwidth of the resultant GI multimode fibers 10 was examined. The results are shown in FIG. 33.

Figure 33:
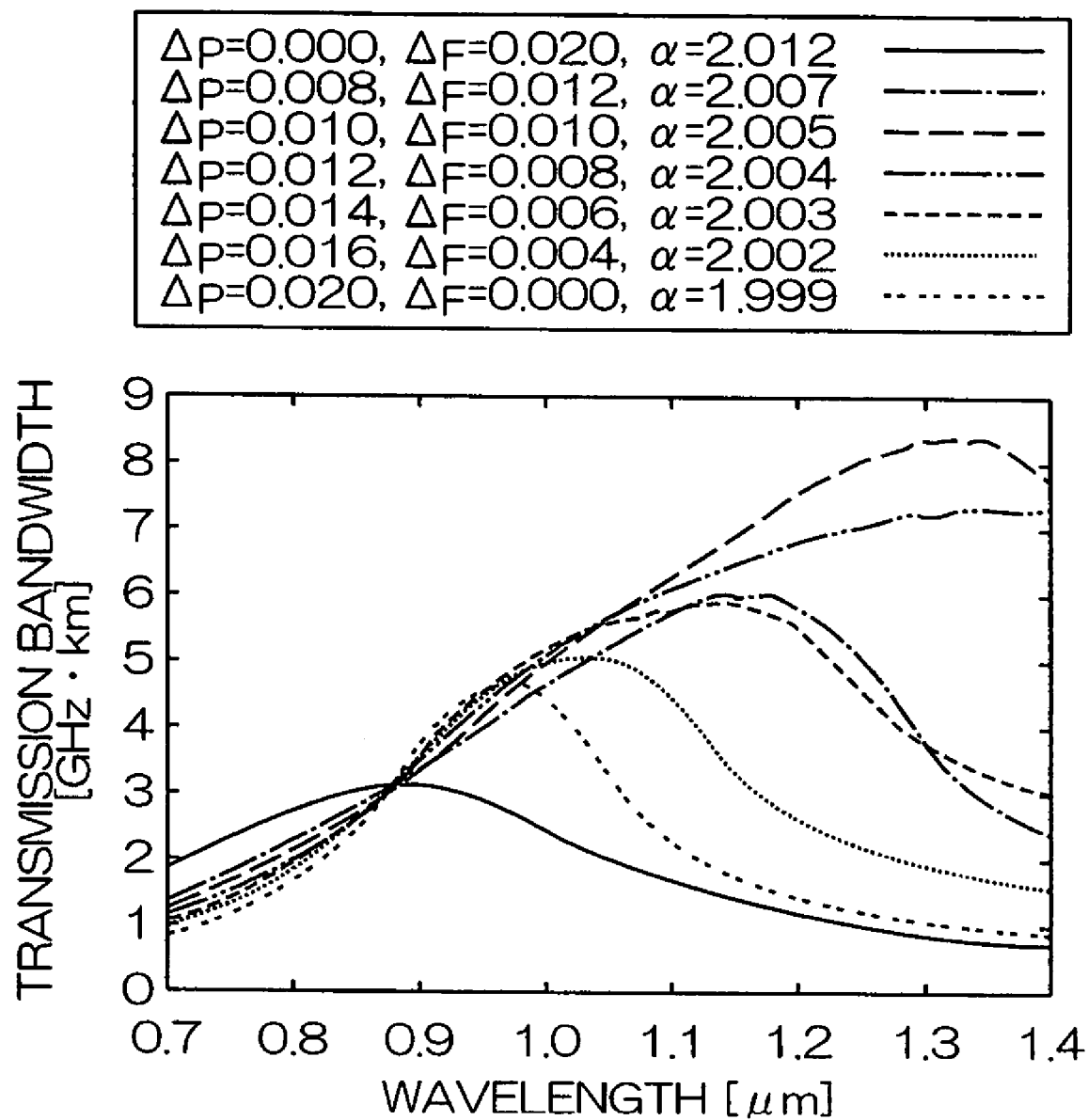
FIG. 33 is a graph illustrating the wavelength dependence of transmission bandwidth of GI multimode fibers of Example 16 having a core doped with phosphorus and fluorine.

The results shown in FIG. 33 confirmed that the GI multimode fibers, including a core doped with phosphorus and fluorine, have a large transmission bandwidth in a wider wavelength range than the GI multimode fibers including a core doped with either phosphorus or fluorine. Furthermore, it was confirmed that the fiber having $\Delta_P$ of 0.010 and $\Delta_F$ of 0.010 exhibits the best performance.

Figure 34:
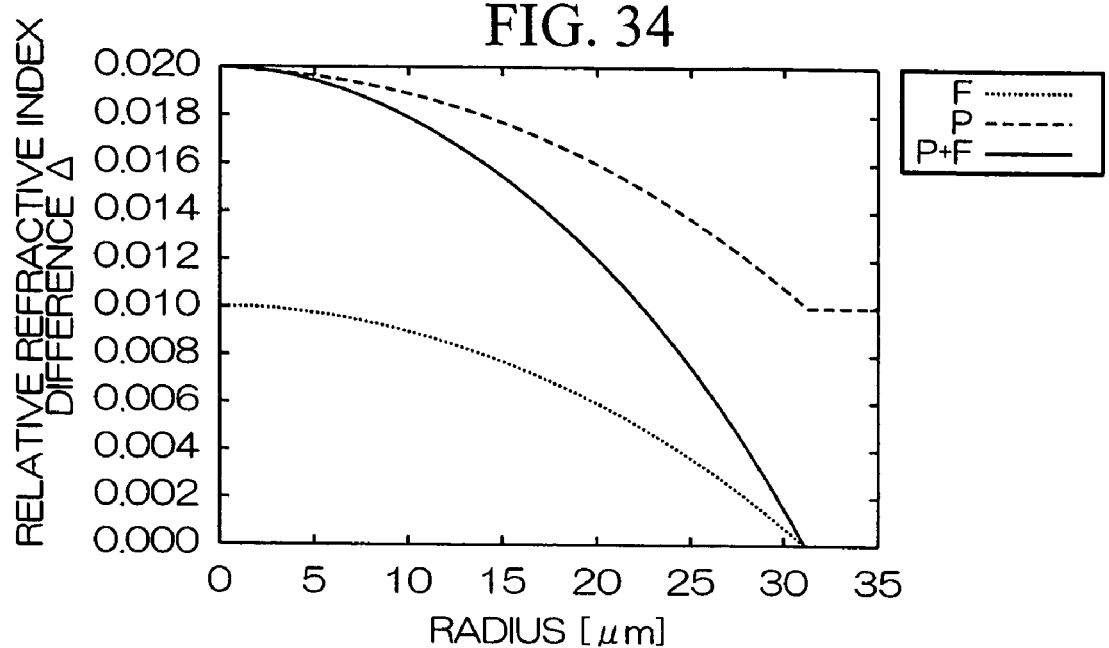
FIG. 34 is a graph illustrating the relative refractive index difference distribution of the GI multimode fibers of Example 16 having $\Delta_P$ of 0.010 and $\Delta_F$ of 0.010.

FIG. 34 is a graph illustrating the relative refractive index difference distribution of the fiber having $\Delta_P$ of 0.010 and $\Delta_F$ of 0.010.

EXAMPLE 17

GI multimode fibers 10, including a core 12 made of silica glass doped with phosphorus and fluorine and a cladding 14 made of silica glass concentrically surrounding the core 12, were fabricated.

The GI multimode fibers 10 were optimized at a wavelength of 1.30 μm, and the relative refractive index difference $\Delta$ of the fiber with respect to the cladding 14 at the center of the core 16 was adjusted to 0.02, and the core radius "a" was set to 31.25 μm.

$\Delta=\Delta_P+\Delta_F=0.02$ was fixed as a constant and the ratio of $\Delta_P$ to $\Delta_F$ was varied.

The wavelength dependence of OFL transmission bandwidth of the resultant GI multimode fibers 10 was examined. The results are shown in FIG. 35.

Figure 35:
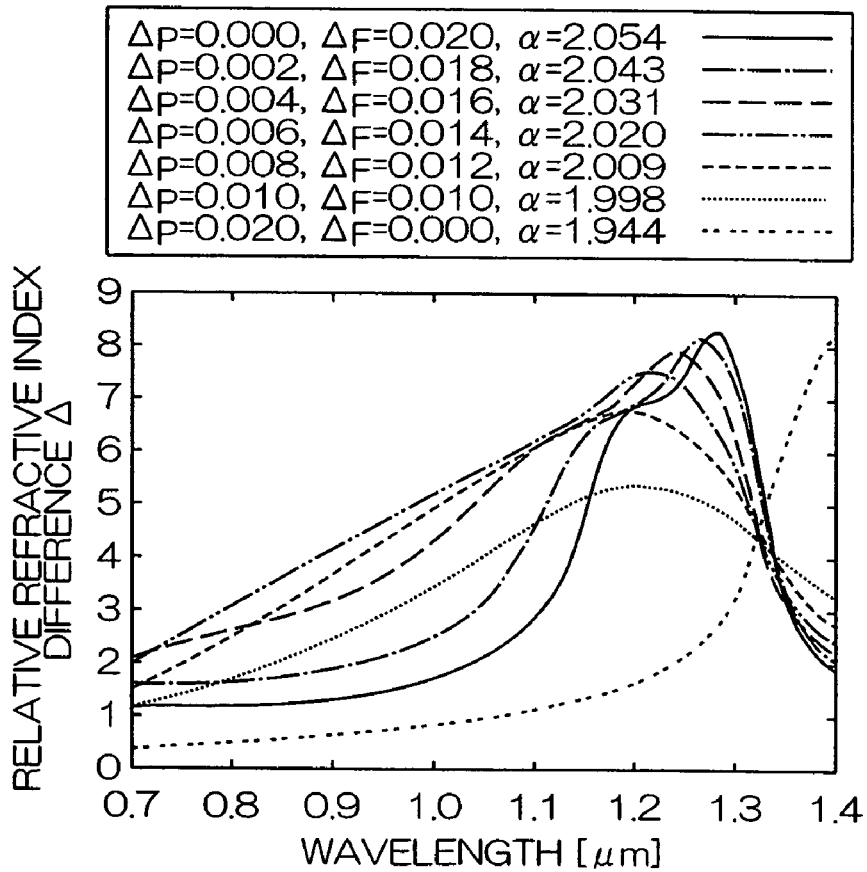
FIG. 35 is a graph illustrating the wavelength dependence of transmission bandwidth of GI multimode fibers of Example 17 having a core doped with phosphorus and fluorine.

The results shown in FIG. 35 confirmed that the GI multimode fibers, including a core doped with phosphorus and fluorine, have a large transmission bandwidth in a wider wavelength range than the GI multimode fibers including a core doped with either phosphorus or fluorine. Furthermore, it was confirmed that the fiber having $\Delta_P$ of 0.006 and $\Delta_F$ of 0.014 exhibits the best performance.

Figure 36:
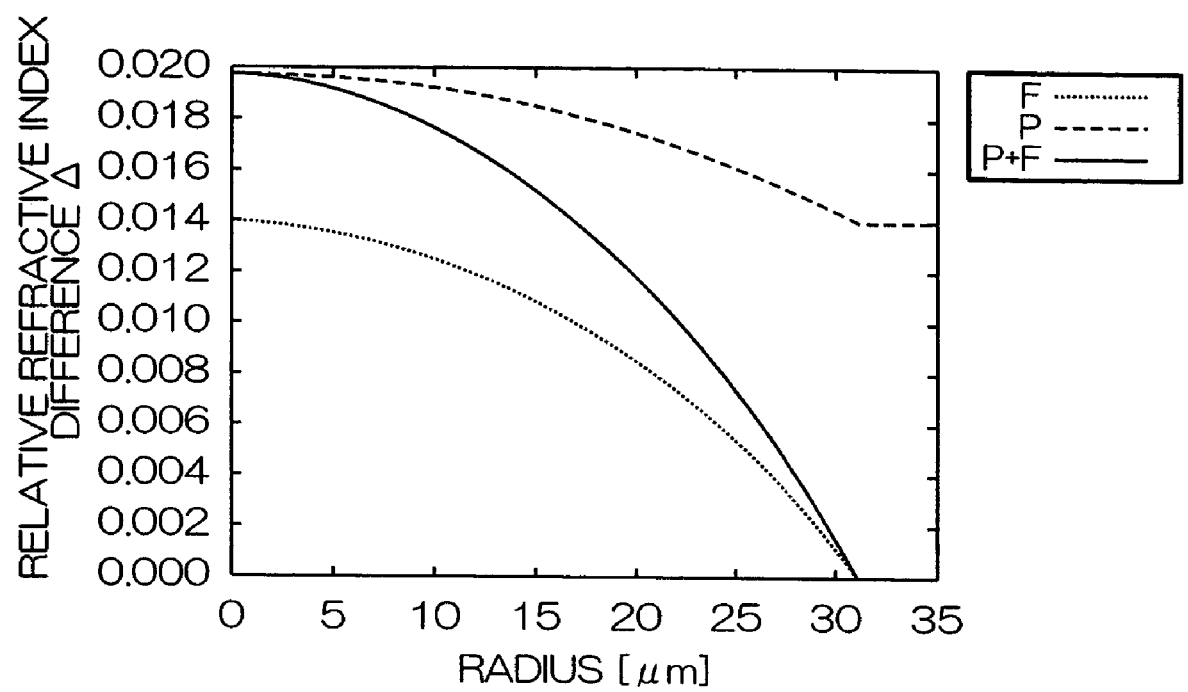
FIG. 36 is a graph illustrating the relative refractive index difference distribution of the GI multimode fibers of Example 17 having $\Delta_P$ of 0.006 and $\Delta_F$ of 0.014.

FIG. 36 is a graph illustrating the relative refractive index difference distribution of the fiber having $\Delta_P$ of 0.006 and $\Delta_F$ of 0.014.

The GI multimode fiber according to the third embodiment of the present invention can be applied to a wavelength division multiplexing (WDM) system based on a multifiber.

While exemplary embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as limited by the foregoing description, and is only limited by the scope of the appended claims.

What is claimed is:

1. A graded-index multimode fiber comprising:
a core containing fluorine; and
a cladding which is provided at an outer periphery of the core,
wherein
the graded-index multimode fiber has a refractive index profile which satisfies the following Formula (1):

$$n(r) = \begin{cases} n_1\left[1 - 2\Delta\left(\frac{r}{a}\right)^\alpha\right]^{1/2} & (0 \leq r \leq a) \\ n_1(1 - 2\Delta)^{1/2} & (r > a) \end{cases} \quad (1)$$

where n(r) is a refractive index of the optical fiber at a distance "r" from the center of the core, $n_1$ is a refractive index at the center of the core, $\Delta$ is a relative refractive index difference of the center of the core with respect to the cladding, "a" is a core radius, and $\alpha$ is a refractive index distribution order;

wherein $\Delta$ is not less than about 0.005 and not more than about 0.025, and a is not less than about 10 μm and not more than about 35 μm.

2. A graded-index multimode fiber comprising:
a core containing fluorine; and
a cladding which is provided at an outer periphery of the core,
wherein
the graded-index multimode fiber has a refractive index profile which satisfies the following Formula (1):

$$n(r) = \begin{cases} n_1\left[1 - 2\Delta\left(\frac{r}{a}\right)^\alpha\right]^{1/2} & (0 \leq r \leq a) \\ n_1(1 - 2\Delta)^{1/2} & (r > a) \end{cases} \quad (1)$$

where n(r) is a refractive index of the optical fiber at a distance "r" from the center of the core, $n_1$ is a refractive index at the center of the core, $\Delta$ is a relative refractive index difference of the center of the core with respect to the cladding, "a" is a core radius, and $\alpha$ is a refractive index distribution order;

wherein a transmission bandwidth at wavelengths between about 0.8 µm and 0.9 µm is greater than about 3 GHz·km.

3. A graded-index multimode fiber comprising:
a core containing fluorine; and
a cladding which is provided at an outer periphery of the core,
wherein
the graded-index multimode fiber has a refractive index profile which satisfies the following Formula (1):

$$n(r) = \begin{cases} n_1\left[1 - 2\Delta\left(\frac{r}{a}\right)^\alpha\right]^{1/2} & (0 \leq r \leq a) \\ n_1(1 - 2\Delta)^{1/2} & (r > a) \end{cases} \quad (1)$$

where n(r) is a refractive index of the optical fiber at a distance "r" from the center of the core, $n_1$ is a refractive index at the center of the core, $\Delta$ is a relative refractive index difference of the center of the core with respect to the cladding, "a" is a core radius, and $\alpha$ is a refractive index distribution order;
wherein a transmission bandwidth at a wavelength band of about 1.3 µm is greater than about 1.5 GHz·km.

4. A graded-index multimode fiber comprising:
a core made of silica glass; and
a cladding which is provided at an outer periphery of the core,
wherein the graded-index multimode fiber has a refractive index profile which satisfies the following Formula (1):

$$n(r) = \begin{cases} n_1\left[1 - 2\Delta\left(\frac{r}{a}\right)^\alpha\right]^{1/2} & (0 \leq r \leq a) \\ n_1(1 - 2\Delta)^{1/2} & (r > a) \end{cases} \quad (1)$$

where n(r) is a refractive index of the optical fiber at a distance "r" from the center of the core, n1 is a refractive index at the center of the core, $\Delta$ is a relative refractive index difference of the center of the core with respect to the cladding, "a" is a core radius, and $\alpha$ is a refractive index distribution order,
the core contains a first substance which generally monotonically decreases the optimum value of the refractive index distribution order $\alpha$ in Formula (1) with an increase in wavelength and at least one second substance which generally monotonically increases the optimum value of the refractive index distribution order $\alpha$ with an increase in wavelength, and
the refractive index distribution order is optimized using the Wentzel-Kramers-Brillouin method so that a transmission bandwidth at an operating wavelength region is maximized.

5. The graded-index multimode fiber according to claim 4, wherein the first substance is germanium and the at least one second substances is fluorine.

6. A method for fabricating a graded-index multimode fiber which comprises a core made of silica glass and a cladding which is provided at an outer periphery of the core, wherein the graded-index multimode fiber has a refractive index profile which satisfies the following Formula (1):

$$n(r) = \begin{cases} n_1\left[1 - 2\Delta\left(\frac{r}{a}\right)^\alpha\right]^{1/2} & (0 \leq r \leq a) \\ n_1(1 - 2\Delta)^{1/2} & (r > a) \end{cases} \quad (1)$$

where n(r) is a refractive index of the optical fiber at a distance "r" from the center of the core, n1 is a refractive index at the center of the core, $\Delta$ is a relative refractive index difference of the center of the core with respect to the cladding, "a" is a core radius, and $\alpha$ is a refractive index distribution order, the method comprising:
doping the core with a first substance, which generally monotonically decreases the optimum value of the refractive index distribution order $\alpha$ in Formula (1) with an increase in wavelength, and with at least one second substance, which generally monotonically increases the optimum value of the refractive index distribution order $\alpha$ with an increase in wavelength,
wherein the optimum value of the refractive index distribution order $\alpha$ is optimized using the Wentzel-Kramers-Brillouin method so that a transmission bandwidth at an operating wavelength region is maximized.

7. A graded-index multimode fiber comprising:
a core made of silica glass; and
a cladding which is provided at an outer periphery of the core,
wherein the core contains phosphorus and fluorine.

8. The graded-index multimode fiber according to claim 7, wherein the graded-index multimode fiber has a refractive index profile which satisfies the following Formula (1):

$$n(r) = \begin{cases} n_1\left[1 - 2\Delta\left(\frac{r}{a}\right)^\alpha\right]^{1/2} & (0 \leq r \leq a) \\ n_1(1 - 2\Delta)^{1/2} & (r > a) \end{cases} \quad (1)$$

where n(r) is a refractive index of the optical fiber at a distance "r" from the center of the core, n1 is a refractive index at the center of the core, $\Delta$ is a maximum relative refractive index difference of a core with respect to the cladding, "a" is a core radius, and $\alpha$ is a refractive index distribution order.

9. The graded-index multimode fiber according to claim 7, wherein the maximum relative refractive index difference $\Delta$ of the core with respect to the cladding is expressed by the following Formula (2):

$$\Delta = \Delta_P + \Delta_F \quad (2)$$

where $\Delta_P$ is a relative refractive index difference of phosphorus with respect to the cladding, and $\Delta_F$ is a relative refractive index difference of fluorine with respect to the cladding.

10. The graded-index multimode fiber according to claim 7, wherein
  the maximum relative refractive index difference $\Delta$ is not less than about 0.005 and not more than about 0.025,
  the relative refractive index difference of phosphorus with respect to the cladding $\Delta_P$ is not less than about 0 and not more than the maximum relative refractive index difference $\Delta$, and
  the relative refractive index difference of fluorine $\Delta_F$ is not less than about 0 and not more than the maximum relative refractive index difference $\Delta$.

11. The graded-index multimode fiber according to claim 7, wherein
  the maximum relative refractive index difference $\Delta$ is not less than about 0.005 and not more than about 0.025, and
  the core radius a is not less than about 10 µm and not more than about 35 µm.

12. The graded-index multimode fiber according to claim 7, wherein
  the maximum relative refractive index difference $\Delta$ is about 0.009 or greater,
  a numerical aperture is about 0.185 or greater, and
  a transmission bandwidth is greater than about 2 GHz·km at wavelengths between about 0.8 µm and 1.4 µm.

13. The graded-index multimode fiber according to claim 7, wherein
  a maximum relative refractive index difference $\Delta$ is about 0.019 or greater,
  a numerical aperture is about 0.26 or greater, and
  a transmission bandwidth is greater than about 1.5 GHz·km at wavelengths between about 0.8 µm and 1.4 µm.

* * * * *